(12) United States Patent
Vanderport et al.

(10) Patent No.: US 10,339,208 B2
(45) Date of Patent: Jul. 2, 2019

(54) ELECTRONIC DOCUMENTATION

(71) Applicant: Brief-lynx, Inc., Denver, CO (US)

(72) Inventors: David M. Vanderport, Denver, CO (US); Lance S. Brink, Parker, CO (US)

(73) Assignee: BRIEF-LYNX, INC., Denver, CO (US)

( * ) Notice: Subject to any disclaimer, the term of this patent is extended or adjusted under 35 U.S.C. 154(b) by 554 days.

(21) Appl. No.: 14/716,549

(22) Filed: May 19, 2015

(65) Prior Publication Data

US 2015/0278169 A1 Oct. 1, 2015

Related U.S. Application Data

(63) Continuation-in-part of application No. 13/523,053, filed on Jun. 14, 2012, now Pat. No. 9,037,566, which is a continuation of application No. 11/761,835, filed on Jun. 12, 2007, now Pat. No. 8,219,543.

(60) Provisional application No. 60/812,727, filed on Jun. 12, 2006.

(51) Int. Cl.
*G06F 7/00* (2006.01)
*G06F 17/30* (2006.01)
*G06F 17/22* (2006.01)
*G06F 3/0484* (2013.01)

(52) U.S. Cl.
CPC ...... *G06F 17/2235* (2013.01); *G06F 3/04842* (2013.01); *G06F 3/04847* (2013.01); *G06F 17/2247* (2013.01); *Y10S 707/99933* (2013.01)

(58) Field of Classification Search
CPC ............. G06F 17/2235; G06F 17/2247; G06F 3/04842; G06F 3/04847; Y10S 707/99933
See application file for complete search history.

(56) References Cited

U.S. PATENT DOCUMENTS

| | | | |
|---|---|---|---|
| 5,283,887 A | 2/1994 | Zachery | |
| 5,822,539 A * | 10/1998 | van Hoff | G06F 17/30899 709/236 |
| 6,122,647 A * | 9/2000 | Horowitz | G06F 17/30873 707/999.003 |
| 6,141,438 A | 10/2000 | Blanchester | |
| 6,147,773 A | 11/2000 | Taylor et al. | |
| 6,389,434 B1 | 5/2002 | Rivette et al. | |
| 6,453,328 B1 | 9/2002 | Schaeffer et al. | |

(Continued)

OTHER PUBLICATIONS

Brava! by Informative Graphics, Brava! Features & Benefits, http://www.bravaviewer.com/:featurebenefits.htm, Sep. 16, 2007, 5 pages.

(Continued)

*Primary Examiner* — Azam M Cheema
(74) *Attorney, Agent, or Firm* — Holzer Patel Drennan

(57) ABSTRACT

The electronic documentation system disclosed herein allows displaying a source document and a destination document side by side in two sections of a graphical user interface. A user may select content from the source document, such as a citation, to be linked to a selected content of the destination document. Furthermore, the user may also annotate the selected content from the destination document. The system allows generating an annotated final document including the source document including a link at the selected source document content to the annotated content of the destination document and a portion of the destination document including at least the annotated content of the destination document.

18 Claims, 24 Drawing Sheets

(56) References Cited

U.S. PATENT DOCUMENTS

| | | | |
|---|---|---|---|
| 7,653,872 B2 | 1/2010 | Yamashita et al. | |
| 8,161,401 B2* | 4/2012 | Chen | G06F 3/0481 |
| | | | 715/724 |
| 2001/0034739 A1 | 10/2001 | Anecki et al. | |
| 2003/0088639 A1 | 5/2003 | Lentini et al. | |
| 2003/0104470 A1 | 6/2003 | Fors et al. | |
| 2004/0001099 A1 | 1/2004 | Reynar et al. | |
| 2004/0006737 A1 | 1/2004 | Colbath et al. | |
| 2004/0085354 A1 | 5/2004 | Massand | |
| 2004/0153649 A1 | 8/2004 | Rhoads et al. | |
| 2004/0249863 A1* | 12/2004 | Kawamura | G06F 17/30569 |
| 2005/0108636 A1 | 5/2005 | Sylthe et al. | |
| 2005/0240866 A1* | 10/2005 | Berstis | G06F 9/543 |
| | | | 715/248 |
| 2006/0010377 A1 | 1/2006 | Anecki et al. | |
| 2006/0050310 A1* | 3/2006 | Ito | H04N 1/32502 |
| | | | 358/1.15 |
| 2006/0061806 A1 | 3/2006 | King et al. | |
| 2006/0253449 A1 | 11/2006 | Williamson et al. | |
| 2006/0282819 A1 | 12/2006 | Graham et al. | |
| 2007/0011140 A1 | 1/2007 | King et al. | |
| 2007/0011190 A1 | 1/2007 | Finney | |
| 2007/0033280 A1 | 2/2007 | Popp et al. | |
| 2007/0033531 A1 | 2/2007 | Marsh | |
| 2007/0300143 A1 | 12/2007 | Vanderport et al. | |

OTHER PUBLICATIONS

MSDN, "Smart Documents Overview—Office 2003 Smart documents Software Development Kit", © 2007 Microsoft Corporation, http://msdn2.microsoft.com/en-us/library/aa193956(office.11,d+printer).aspx, Sep. 16, 2007, 1 page.

TGL Media Inc., "The Facts About Hyperlinked Briefs", Sep. 16, 2007, http://www.tglmedia.com/Pages/the factsabout.html, 3 pages.

"Meta-Scripts as a Mechanism for Complex Web Services" (1995).

* cited by examiner

ELECTRONIC DOCUMENTATION

CROSS-REFERENCE TO RELATED APPLICATIONS

This patent application is a continuation-in-part (CIP) application of and claims the benefit of U.S. Non-Provisional patent application Ser. No. 13/523,053 filed Jun. 14, 2012, entitled "ELECTRONIC DOCUMENTATION," and to be issued as U.S. Pat. No. 9,037,566, which is a continuation of and claims priority of the U.S. Non-Provisional patent application Ser. No. 11/761,835 filed Jun. 12, 2007, entitled "ELECTRONIC DOCUMENTATION," and issued as U.S. Pat. No. 8,219,543, which claims priority of the U.S. Provisional Application Ser. No. 60/812,727, filed Jun. 12, 2006, entitled "ELECTRONIC DOCUMENTATION", and each of the '835 application and the '727 application is hereby incorporated by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2007 eTrial Communications, Inc.

TECHNICAL FIELD

Embodiments of the present invention generally relate to electronic documentation. More specifically, embodiments of the present invention relate to methods, systems and computer-readable media for generating structured electronic documents.

BACKGROUND

Electronic documentation continues to evolve in content and complexity. Business and government are gradually recognizing this and have begun introducing business systems and processes to take advantage of the additional richness in such documentation. For example, judges are increasingly asking for electronic, hyperlinked briefs on CD-ROM or USB media to supplement more traditional static hardcopy and electronic documents that are filed with the courts. Government agencies, such as the United State Patent and Trademark Office, are increasingly allowing applicants to file documents electronically.

The benefits of developing and providing documentation in electronic form are many. Electronic documentation is typically more compact, manageable and easily portable or transmittable, than hard copies. For example, a large document can be carried on a small memory medium, such as a compact disc or a USB Flash Drive. Using electronic references, such as hyperlinks, in an electronic document, a referenced document can be quickly and easily accessed by the reader, without fumbling with numerous hard copies. By contrast, if hard copies are used, the reader must be able to hold his place in a document that references other documents while physically finding and turning to the referenced section(s) of the referenced documents.

However, with electronic documentation come challenges including secure access and version control. For example, in a court trial it is imperative that the court receive the final version of a brief, and that there is no risk of tampering with, or unauthorized editing of, the brief before it is delivered to the court. In addition, all parts of the brief should be included in the delivered electronic form in a way that enables the judge or clerk to quickly access referenced parts of the brief. Judges and other readers will no doubt appreciate electronic references that precisely access the referenced material, rather than references that access an arbitrary place in a referenced document. Furthermore, creators of briefs and other electronic documents need a way to quickly and efficiently generate electronic documents that have multiple parts with confidence that the electronic documents are secure, complete, and accurate.

It is with regard to the foregoing and other problems that embodiments of the invention have been made.

SUMMARY

Embodiments of methods, systems and computer-readable media are described herein for use in generating a structured electronic document. A structured electronic document is created by linking one or more supplemental content items to a primary document. The supplemental content items may or may not include annotations. When the user selects a content item for inclusion in the structured electronic document, a copy of the selected content item is created in an annotatable format. The user may choose to create annotations in a selected supplemental content item. Links are created between the primary document and selected supplemental content items through manual and automated processes such as Natural Language Programming (NLP) or other programming to create a dynamic link between two or more documents. The primary document and supplemental content items are assembled into a self-contained structured electronic document.

An embodiment of a method includes receiving a selection of an original content item, deriving a supplemental content item from the original content item, designating a unique identifier to the supplemental content item, and inserting a reference including the unique identifier into the primary document. Deriving the supplemental content item may include generating a snapshot of the selected original content item. The method may further include deriving an annotated supplemental content item from the supplemental content item, wherein the annotated supplemental content item includes at least one annotation and a subset of content from the supplemental content item. Another unique identifier may be designated for the annotated supplemental content item. Another reference may be inserted into the primary document that includes the unique identifier of the annotated supplemental content item. The annotated supplemental content item may include a plurality of annotations and the reference may reference the sequentially first annotation in the annotated supplemental content item.

In an embodiment of a method deriving the annotated supplemental content item includes steps of presenting a control through a user interface that is operable to receive a request from a user to annotate the supplemental content item, receiving a request from the user through the control to annotate the supplemental content item, and launching an annotation module having another user interface through which the user can enter one or more annotations. The one or more annotations may be selected from a group consisting of a mark, text, or a zoom setting. Creating a supplemental document may further include copying the selected candidate content item to the specified location. The method may further include storing the annotated supplemental content item in a file having a filename specified by the user.

In some embodiments of a method, deriving the supplemental document further includes creating the supplemental content item in an annotatable format. The annotatable format may be different from the format of the selected original content item. The method may further include assembling the primary document, the supplemental content item and the annotated supplemental content item into a structured electronic document. The method may further include storing the structured electronic document on a portable memory medium. The method may further include storing the structured electronic document in a remote repository accessible to only authorized users. The method may still further include determining whether the user has an account balance above a specified threshold prior to assembling the structured electronic document. In some embodiments assembling the structured electronic document includes converting the format of the primary document to another format and locking the structured electronic document to prevent further editing.

An embodiment of a system includes a candidate content item repository having one or more content items that can be included in a structured electronic document, a copy module configured to derive a base supplemental content item from a selected one of the candidate content items and further configured to designate a unique identifier for the base supplemental content item, and a document editor configured to receive the unique identifier and insert the unique identifier into a reference to the base supplemental content in the primary document. The system may further include a document editor including a user interface configured to enable a user to select one of the candidate content items for inclusion into the structured electronic document. The user interface presents a plurality of supplemental content items included in the structured electronic document, and wherein the user interface is further configured to receive a selection of one of the plurality of supplemental content items.

An embodiment of the system may still further include an annotation module configured to insert annotations in a selected supplemental content item. The annotation module may further be configured to derive an annotated supplemental content item, generate a filename for the annotated supplemental content item and provide the filename to the document editor for presentation in the user interface. The copy module may further be configured to create the base supplemental content item in an annotatable format. The system may further include a structured electronic document manager configured to create the structured electronic document by assembling the primary document, the base supplemental content item and the annotated supplement content item.

In some embodiments of the system the primary document includes a reference to the annotated supplemental content item. The structured electronic document manager may be further configured to store the structured electronic document on a portable memory medium. The user interface includes a control enabling the user to remove a supplemental content item from a list of the plurality of supplemental content items.

An embodiment of a computer-readable medium has instructions to cause a computer to carry out a process including steps of selecting a supplemental content item having content to be added to a structured document, annotating the selected content item to derive an annotated supplemental content item, designating a unique identifier for the annotated supplemental content item, generating a reference to the annotated supplemental content item, the reference including the unique identifier, and inserting the reference into a primary document to link the primary document to the annotated supplemental content item. The process may further include presenting a user interface including a content item insertion control, which enables the user to insert a supplemental content item into the structured electronic document.

The process further may still further include presenting a supplemental content item removal control, which enables the user to remove a supplemental content item from the structured electronic document. Further still the process may include, in response to the user selecting the content item insertion control, presenting a list of one or more content items stored in a first data store. Still further, the process further comprises copying the selected supplemental content item from the first data store to a second data store. The may still further include prompting the user to enter a filename for the copy of the selected supplemental content item.

In some embodiments of the computer-readable medium, the process may still further include automatically prompting the user annotate the copy of the selected content item. Inserting may include creating a hyperlink in the primary document to the supplemental content item. The process may further include assembling parts of the structured electronic document and storing the structured electronic document in a memory according to a predetermined structured format.

An embodiment of the computer-readable medium may cause a computer to carry out a process of storing the structured e-document in a memory according to a predetermined structured format comprises storing the structured e-document on a compact disk read-only memory (CD-ROM). The structured format may be a format utilized by a judicial court. The process may further include converting the selected supplemental content item into an annotatable format if the selected supplemental content item is not in an annotatable format.

BRIEF DESCRIPTION OF THE DRAWINGS

FIG. 18 illustrates alternative an example graphical user interface for visual linking of destination documents.

FIG. 19 illustrates yet alternative example graphical user interface for visual linking of destination documents.

Figure 1:
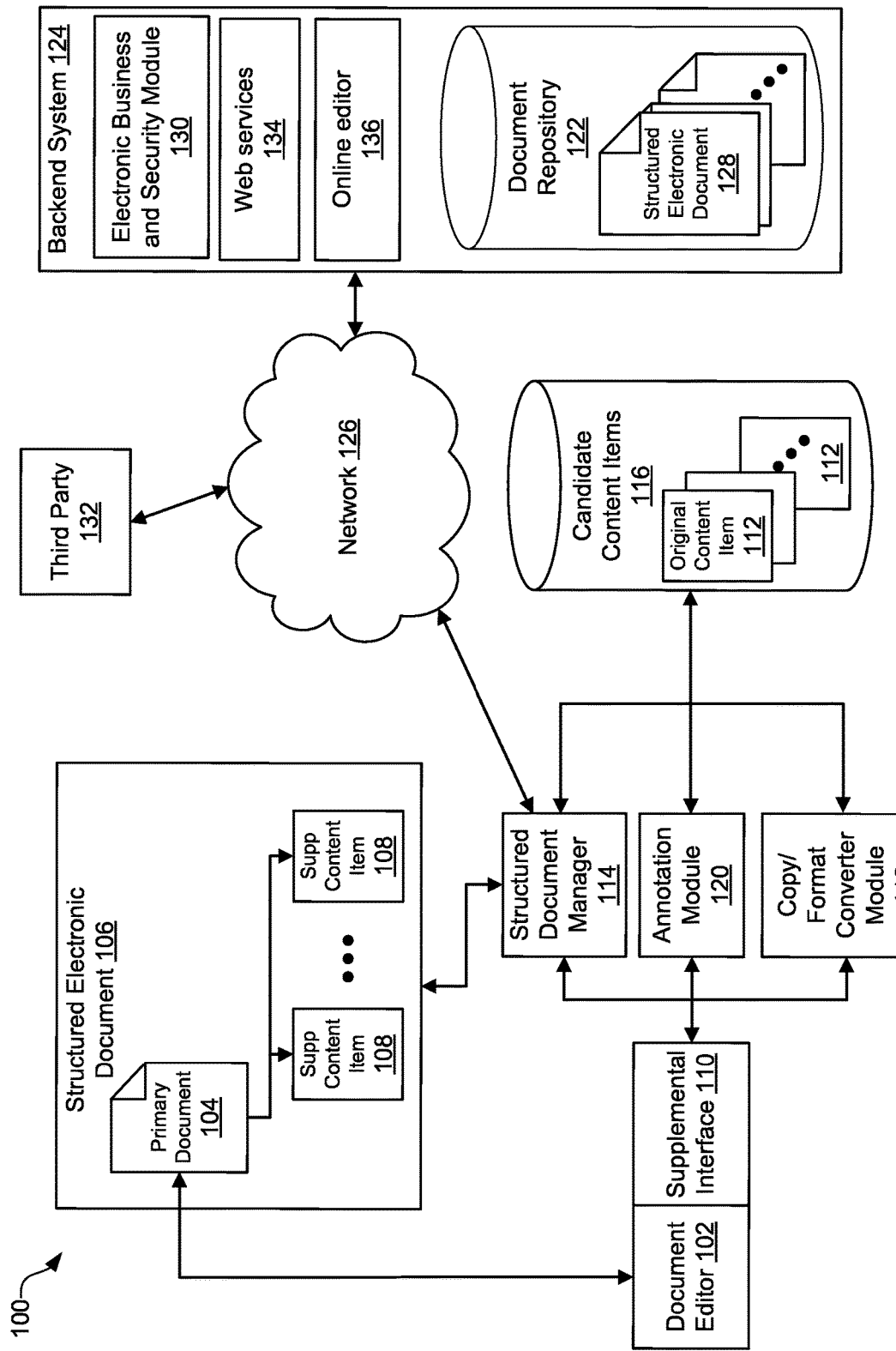
FIG. 1 illustrates an electronic document generation system in accordance with an embodiment of the present invention.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of methods, systems and computer-readable media are described herein for use in generating a structured electronic document. A structured electronic document is created by linking one or more supplemental content items to a primary document. The supplemental content items may or may not include annotations. When the user selects a content item for inclusion in the structured electronic document, a copy of the selected content item is created in an annotatable format. The user may choose to create annotations in a selected supplemental content item. Links are created between the primary document and selected supplemental content items. The primary document and supplemental content items are assembled into a self-contained structured electronic document.

Definitions

The term "structured electronic document" (or structured e-document) refers to an electronic document that includes multiple component parts that are self-contained, wherein one component part may accessibly reference another component part. Component parts typically include a primary document and one or more supplemental content items. One or more supplemental content items may include annotations or be annotated versions of other supplemental content items.

The term "accessibly reference" or related terms refer to enabling access to an item identified by a reference. In some embodiments the reference is a hyperlink. In some embodiments the reference is an icon or other mark that identifies an embedded item.

An annotatable content item is an item of content that is capable of being annotated.

A non-annotatable content item is an item of content that is incapable of being annotated.

The term "annotation" refers to an explanatory edit made to a content item. The explanatory edit may include any type of edit made to a content item, such as, but not limited to, a note or mark made in the content item, highlighting, or "zooming" in on an area of the content item, or any combination thereof. Exemplary marks include arrows, underlining, boxes, circles, and so on. Multiple annotations may be clustered into an annotation set.

The term "content item" refers to any item of electronic content, such as, but not limited to, a text document, multimedia document, audio, video, and image. A content item may be in any format, such as, but not limited to, American Standard Code for Information Interchange (ASCII), Word™, PowerPoint™ (ppt), Portable Document Format (pdf), Joint Photographic Experts Group (jpg), Graphic Interchange Format (gif), single page tagged image file format (tiff), multi-page tiff, content sealed format (CSF), bitmap (bmp), Portable Network Graphics (png), Windows™ Media File (wmf), Motion Picture Experts Group (mpg) (e.g., mp3, etc.), audio video interleave (avi), QuickTime™ (mov), RealVideo (e.g., rm, ram, etc.), and Flash (swf).

The term "control" refers to a mechanism presented through a user interface and enabling the user can enter a command or data. By entering a command or data through a control, the user can cause associated processing to occur. Examples of controls are buttons, fields, drop-down menus, check-boxes, and so on. Although controls are typically accessible through a graphical user interface, controls may also be accessible through speech, as in speech recognition. A control can be selected in various ways, depending on the type of control and the particular embodiment. For example, a visual control may be selected through single clicking a mouse button, double clicking (two clicks separated by a short period of time) a mouse button, depressing one or more keys on a keypad, or tapping a stylus or other pointer device on a video screen. In other embodiments, controls may be selected through audible commands, such as through voice recognition.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Example System

FIG. 1 illustrates an exemplary system 100 for generating an electronic document. In various embodiments, the electronic document is structured. One particular embodiment of the system is suitable for generating a legal brief that may be submitted to a court. The legal brief may include multiple associated component parts, such as files, which are included in the structure. Exemplary systems and methods for creating an electronic legal brief (referred to as an e-brief) are illustrated and described to enable one of skill in the art to make and use embodiments of the invention. It will be understood, however, that the invention is not limited to e-brief applications, and numerous other types of electronic documents can be created, edited and viewed.

In the illustrative embodiment of FIG. 1, the structured electronic document generation system 100 includes a document editor 102 through which a user can create a document.

The initial document that the user creates is referred to as a primary document 104, which will be included in a structured electronic document 106. In addition to the primary document 104, the structured electronic document 106 generally includes one or more supplemental content items 108, which are referenced by the primary document 104. The primary document 104 may be viewed as the base document through which the creator, and possibly other users, may edit and/or view the structured electronic document 106.

In the illustrated embodiment, the document editor 102 includes a user interface. A portion of the user interface, such as a supplemental interface 110, provides an interface through which the user can add supplemental content items 108 for inclusion in the structured electronic document 106. In a particular embodiment, the supplemental interface 110 is a context aware interface. The supplemental interface 110 typically includes one or more window panes having text (e.g., supplemental content item names) and/or controls. In accordance with such an embodiment, the document editor 102 and supplemental interface 110 may include Word™ with Smart Document™ technology from Microsoft™. Using Smart Document™ technology, the supplemental interface 110 includes a task pane with controls and data that can be configured for a particular application. It is to be understood that the invention is not limited to Word™ with Smart Document™ technology. Exemplary screen shots of such an implementation are shown and discussed below to illustrate an exemplary e-brief creation scenario.

Through the supplemental interface 110, the user can select from a group of one or more candidate content items 112 that can be used to create one or more supplemental content items 108 for inclusion in the structured electronic document 106. In one embodiment, the user can select a control that requests to add a supplemental content item. Responsive to the request, the supplemental interface 110 sends a request to a structured document manager 114. The structured document manager 114 retrieves names of one or more candidate content items 112 stored in a candidate content item data store 116, and sends the names to the supplemental interface 110. The supplemental interface 110 presents the names of the candidate content items 112 to the user. The names may be presented in a list, such as in a drop-down menu, or otherwise.

Although one candidate content item data store 116 is shown in FIG. 1, it is to be understood that the candidate content items 112 could be stored in multiple locations or data stores. The location from which to find and retrieve the candidate content items 114 may be specified by the user. Each candidate content item 112 is in an original form. Typically a candidate content item 112 comprises a file having a format and having content of a particular type or types. For example, a content file could include text, graphics, video, audio, or others, or any combination thereof.

Figure 2:
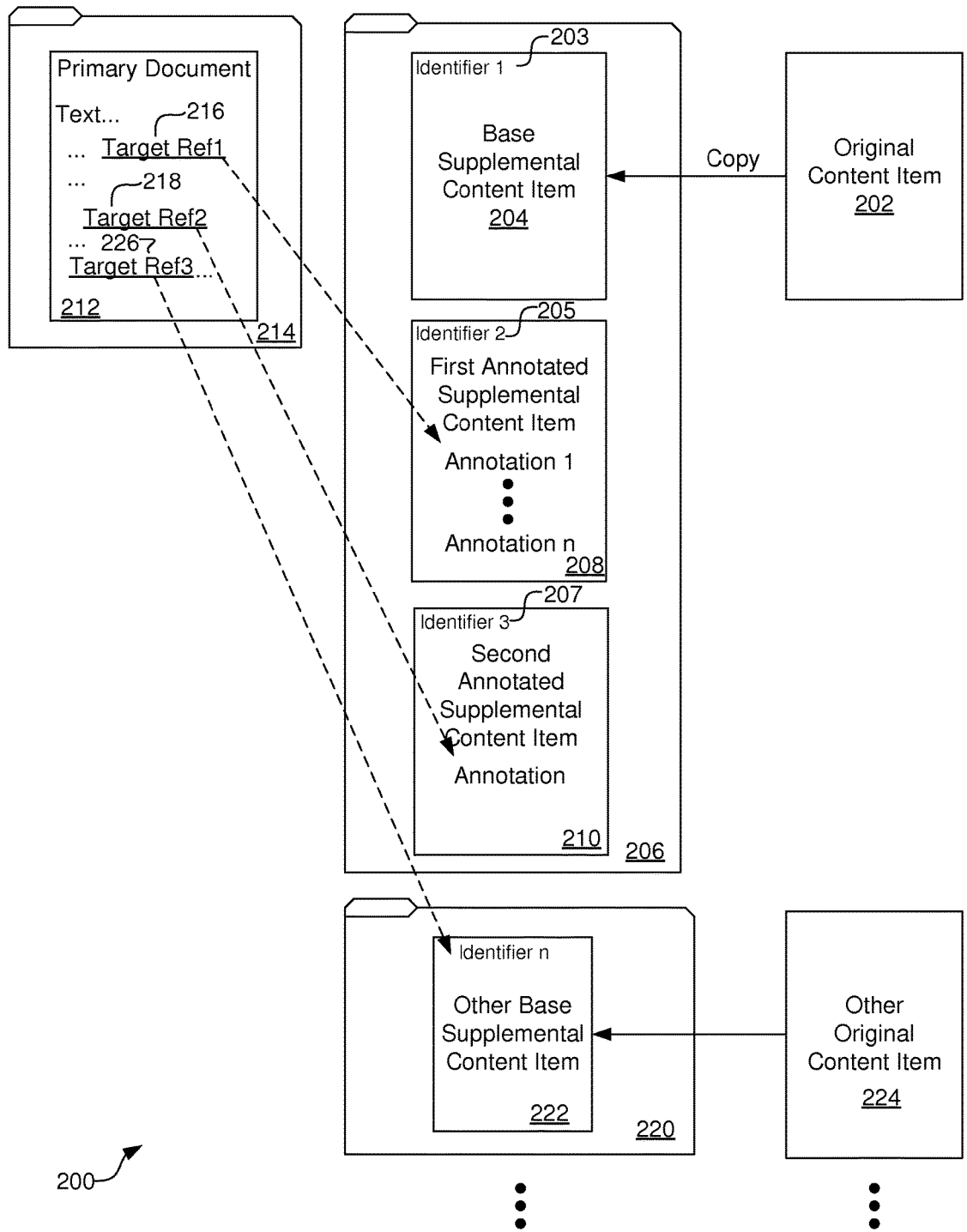
FIG. 2 illustrates an exemplary scenario involving organizing annotated portions of a selected content item in accordance with one embodiment.

Embodiments allow for creating a base supplemental content item from the selected original content item 112 for use in the structured document 106. The base supplemental content item is typically a copy of the original content item 112. The copy may be a direct replica or a format-converted representation of the original content item 112. As discussed further below, the format may be converted to an annotatable format when the format of the original content item 112 is not in an annotatable format. Creating a copy of the original content item 112 can be useful for a few reasons. For example, the copy can be stored at a known location where it can be linked to and assembled with the primary document 104 into the structured document 106, thereby avoiding reliance upon the original content item 112, which may be moved or deleted. In addition, the user can create annotated content items from the copy of the original content item 112 without the risk of altering the original content item 112, thereby preserving the original content item 112. FIG. 2, which is discussed in detail below, illustrates one possible scenario for creating a base supplemental content item from an original content item for use in generating a structured electronic document.

Each supplemental content item 108 may or may not include annotations. As mentioned, embodiments enable a user to create annotated supplemental content items to be included in the structured document 106. In various embodiments, a copy/format converter module 118 may create a copy of the selected candidate content item 112 to create a base supplemental content item in a format that is readable by an annotation module 120. The format of the base supplemental content item may or may not be different from the format of the original content item 112. The user is prompted to provide a name for the base supplemental content item. The base supplemental content item is stored at a specified location and given the name provided by the user.

In some embodiments the candidate content items 112 can be composed of multiple logical segments, such as pages, video frames, and sheets or otherwise. In such embodiments, the user is enabled to include a subset of the selected content item in a supplemental content item 108. As such, in general a content item may or may not be composed of segments or portions, and the entire content item or a subset thereof may be included in a supplemental content item 108 of the structured document 106. One or more of the supplemental content items 108 may be made target content items that are referenced by the primary document 104. For example, the base supplemental content item as a whole could be a target, or a portion of the content item could be a target.

As discussed above, a supplemental content item 108 can include annotations. As such, after the copy of a selected candidate content item 112 is created, the annotation module 120 may be activated for annotating the copy of the selected original content item. In one embodiment, the annotation module 120 comprises the brava!® reader from Informative Graphics Corporation. In embodiments using brava!® reader, the format converter module 118 converts the selected original content item 114 into Portable Document Format (pdf), which is a format used by brava!® reader.

The structured document manager 114 links the primary document 104 to the supplemental content items 108 and assembles the primary document 104 and supplemental content items 108 into a single package. In one embodiment, the linking is performed by creating a hyperlink reference to the supplemental content item 108 in the primary document 104. In some embodiments, the linking may be performed by embedding an electronic document in the primary document 104.

The assembly process may involve several steps. First, the assembly may involve converting the primary document 104 into a standard readable and/or portable format, such as portable data format (pdf). The primary document 104 and supplemental content items 108 are then stored according to a specified structure, such as in an arrangement of files, to form the structured electronic document 106. The structured electronic document may be stored on a portable memory medium, such as a compact disc or USB flash drive. The structured electronic document 106 may alternatively, or in addition, be stored in a remote repository 122 of a backend system 124. The backend system 124 may execute on a server computer having a server application for communicating with the structured document management module 114.

In this regard, the structured document management module 114 may include a client application operable to communicate with the backend system 124 via a network 126, such as the Internet. The structured electronic documents 128 stored in the remote repository are securely stored by an electronic business and security module 130 of the backend system 124. The electronic business and security module 130 locks the structured electronic documents 128 to prevent further editing, and limits access to the structured electronic documents 128 to authorized users, such as the creator and designated third parties 132. In some embodiments, the designated third parties 132 include court officials, such as judges or court clerks.

The backend system 124 can include one or more online web services 132. Users can subscribe to one or more of the web services 134. For example, in some embodiments, users can subscribe to an electronic structured document creation and storage service that is managed by the electronic business and security module 130. The backend system 124 can also include an online editor 136 through which users can edit the structured electronic documents. The online editor 136 typically includes a supplemental interface and editor that has functionality similar to the supplemental interface 110, annotation module 120, copy/format converter module 118, and/or the structured document manager 114. The backend system 124 may also include a workspace (not shown) that users can work in.

In some embodiments, users may have accounts set up with the backend service that are accessible to the electronic business and security module 130. The user may be required to pay for each assembly of a structured document. Prior to assembly, the electronic business and security module 130 is operable to check the account balance of the user requesting assembly, and only allow assembly if the account balance is above a specified threshold. If the account balance is below the threshold, the user may be denied the assembly service or may be prompted to pay or add money to the user's account prior to assembly of the structured electronic document 128.

In some embodiments, the backend system 124 includes functional modules (not shown) configured to provide various functionalities. For example, a files module is operable to present the files that a user has in his/her account. A chat or collaboration module is operable to enable co-workers, friends, or associates to collaborate on a document online while working on the document. As yet another example, a calendar module may be available for a user to keep track of docket dates and deadlines. These modules are typically implemented in computer-executable software instructions. However, in general modules may be software, hardware or firmware or any combination thereof. For example, a module could be implemented with one or more application specific integrated circuit(s) (ASICs), or logic in a Flash EEPROM, or other technology.

The various components and data illustrated in the system 100 of FIG. 1 may be located at one or more computers. For example, the document editor 102 and supplemental interface 110 may be on a PC that is local to the user. The candidate content item data store 116 and/or the structured document 106 may be remote from the user's PC. Furthermore, the various modules and components may be combined, rearranged, or their functionality broken out into other modules and components in numerous different ways as appropriate to a particular embodiment. For example, the functionality of the structured document management module 114 may be incorporated into the supplemental interface 110. As another example, the functionality of the structured document management module 114, the annotation module 120 and the format converter 118 could be combined.

FIG. 2 illustrates an exemplary scenario 200 involving organizing supplemental content items for use in a structured document in accordance with one embodiment. An original content item 202 is selected for use in a structured electronic document. A copy of the original content item 204 is stored at a designated location. The copy may be referred to as a base supplemental content item 204. The base supplemental content item 204 is given a unique identifier, identifier 1 (203), which can be used by the primary document 212 to reference the base supplemental content item 204. In some embodiments, the base supplemental content item 204 is created in an annotatable format that may be different from the format of the original content item 202. In this illustrative scenario 200, the designated location is a supplemental content item file folder 206. The user can create one or more annotated supplemental content items from the base supplemental content item 204. An annotated supplemental content item 208 may be composed of a subset of the base supplemental content item 204.

As discussed above, the user may add one or more annotations to a portion of the base supplemental content item 204. When the user has finished entering the one or more annotations at least a subset of the base supplemental content item 204 is stored including the annotations. For example, a first supplemental content item 208 can be created that includes annotation "1" through annotation "n". Similarly, a second supplemental content item 210 can be formed that includes an annotation. Each of the annotated supplemental content items 208, 210 is given a unique identifier, identifier 2 (205) and identifier 3 (207), which can be used in the primary document 212 to reference the annotated supplemental content items 208, 210, respectively.

In the illustrated embodiment, a primary document 212 is in another location, such as primary file folder 214. Target references, such as "Target Ref1" 216 and "Target Ref2" 218, are inserted into the primary document 212 and made to accessibly reference Annotation 1 of the first annotated supplemental content item 208 and the Annotation of the second annotated supplemental content item 210, respectively. Target Ref1 216 and Target Ref2 218 may be hyperlinks. Target Ref1 216 and Target Ref2 218 each include the unique identifier 1 (205) and unique identifier (207) associated with annotated supplemental content item 208 and annotated supplemental content item 210, respectively. According to one embodiment, when an annotated supplemental content item includes more than one annotation, the target reference references the first annotation in the content item. For example, Target Ref1 216 references the first annotation (Annotation 1) in the first annotated supplemental content item 208. In other embodiments the target reference can be made to reference an annotation other than the first annotation in the annotated supplemental content item.

One or more other supplemental content item folders 220 may be created that each store a base supplemental content item 222 created from another original content item 224. To further illustrate target referencing, a third target reference, Target Ref3 226 is shown in the primary document 212 referencing the other base supplemental content item 222. The other supplemental content item folder(s) 220 may each include one or more other annotated supplemental content items created from the other base supplemental content item in the respective file folder. The supplemental content item file folder 206 and other supplemental content item file folders 220 may be related to the primary file folder 214 in numerous ways. For example, the primary file folder 214 may be in hierarchical relation to the supplemental content item file folder 206 and other supplemental content item file folders 220.

Figure 3:
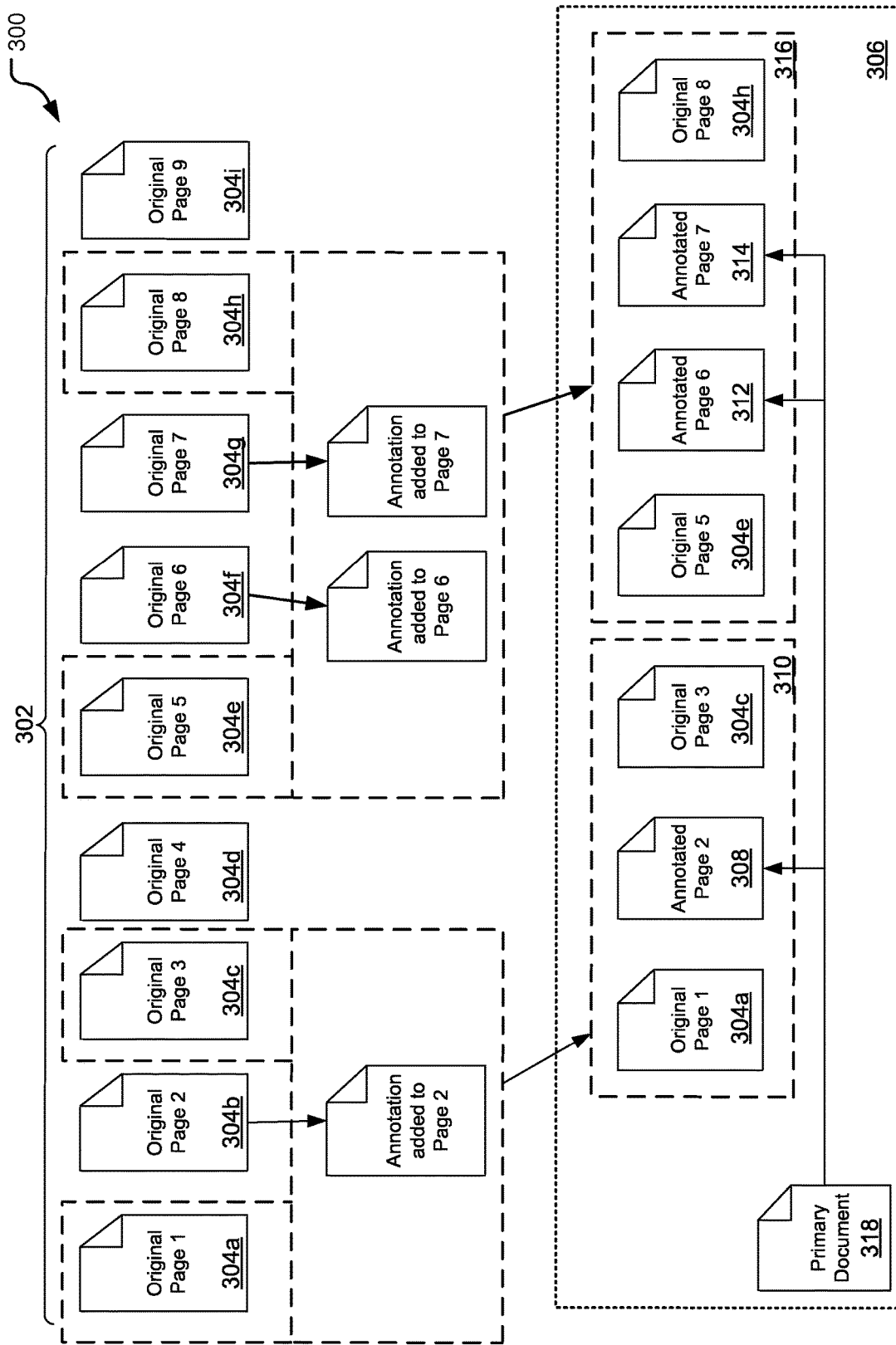
FIG. 3 illustrates an exemplary scenario involving generating a structured electronic document in accordance with one embodiment.

FIG. 3 illustrates an exemplary scenario 300 involving generating a structured electronic document in accordance with one embodiment. An original content item 302 (or a copy thereof) is composed of nine pages: 304a-304i. It is assumed that the user has selected the original content item 302 for inclusion of at least a portion of the original content item 302, or an annotated portion of the original content item 302, in a structured document 306.

Although the content item 302 is illustrated as pages (e.g., pages in a document), it is to be understood that the content item does not need to be composed of pages, but rather may include any other type of segments or portions. For example, the content item could be composed of multiple frames of video, wherein one or more frames could be selected for inclusion in the structured document 306. The content item 302 could also be composed of slides of still photos or graphics. As such, annotations could be added to multiple different types of content.

Continuing with the exemplary scenario illustrated in FIG. 3, the user adds an annotation to page 2 (304b). Annotating may involve adding one or more marks (e.g., circles, arrows, boxes, underline) or text to the page, zooming in on a particular area in the page, highlighting, or otherwise, or any combination thereof.

When the user is finished annotating page 2 (304b), a subset of the content item 302 is saved that includes the annotation on page 2. In the illustrative example, the page that includes the annotation (annotated page 2 (308)) is saved, along with at least a portion of the content item 302 surrounding the annotation. The amount of the content item 302 that is saved with the annotation may be specified by the system or the user. For example, the user may be prompted to set the amount of content around the annotation that is to be stored with the annotation. In the particular scenario illustrated in FIG. 2, one page before the annotated page 308 and one page after the annotated page 308 are stored to form a supplemental content item 310. However, the invention is not limited to inclusion of one page on either side of the annotated page. In other embodiments, the annotated page 308 can be saved without any portion of the surrounding pages. As another example, the specified portion may include portions of the surrounding pages, which may be specified as a number of lines, a percentage, or otherwise. In some embodiments the amount of content stored with the annotation can be dynamically adjusted by the user, so that different amounts could be specified for different annotations or different types of content. The supplemental content item 310 is stored as a file at a designated location.

Continuing with the illustrative scenario, the user adds at least one annotation to page 6 (304f) and at least one annotation to page 7 (304h). These annotations are included in annotated page 6 (312) and annotated page 7 (314), respectively. In this case, original page 5 (304e) and original page 8 (304h) are stored with annotated page 6 (312) and annotated page 7 (314). However, as discussed above, the subset of the original content item 302 that is stored with the annotations is not limited to a single or full page surrounding the annotations. The annotated page 6 (312), annotated page 7 (314), original page 5 (304e) and original page 8 (304h) are stored together as a file to form another supplemental content item 316.

Target references to the first supplemental content item 310 and the second content item 316 are added to a primary document 318 of the structured document 306. In one embodiment, the references refer to the first annotation in each supplemental content item. In this embodiment, when the reader selects a target reference in the primary document 318, the associated annotation is presented to the user. For example, the browser or reader application being used by the user may navigate to the associated annotation. The user then may navigate or scroll to other portions of the supplemental content item, including other annotations within the supplemental content item.

Example Graphical User Interface

FIGS. 4-10 illustrate graphical user interfaces (GUIs) for use in generating a structured electronic document in accordance with one embodiment. The GUIs may be employed in a structured electronic document generation system, such as that shown in FIG. 1. In general, a user can create, edit, store and otherwise manipulate parts of a structured document through the GUIs. Parts of the structured document include a primary document and supplemental content items. The GUIs can be used to link the primary document with the supplemental content items and assemble the primary document and supplemental content items.

Figure 4:
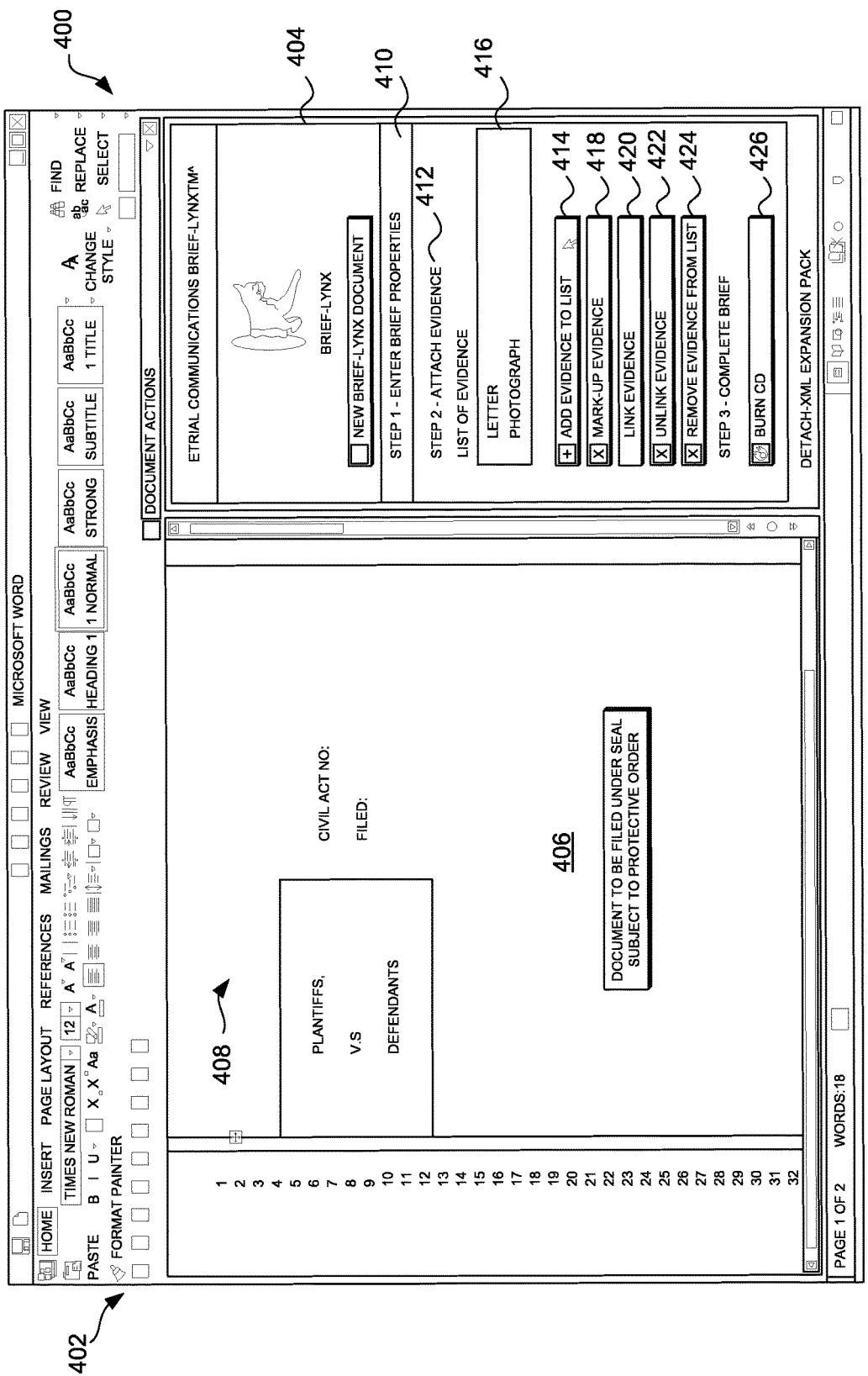
FIGS. 4-11 illustrate exemplary screen shots of one or more graphical user interfaces for use in generating a structured electronic document.

FIG. 4 illustrates a GUI having a first portion including a primary user interface 402 and a second portion including supplemental user interface 404. In general, the primary user interface 402 is used by the user to manipulate a primary document, such as a court brief 406 that may be filed in court. In one embodiment, the primary document is a template having multiple fields into which a user may enter text. The template may be based on an Extensible Markup Language (XML) document that defines the structure of the template and the fields. The primary user interface 402 typically includes conventional user interface tools such as text and paragraph formatting tools, file opening and saving tools, and others. In the particular example illustrated, the complaint 406 includes a caption 408, which has fields for text that identifies the court case and participants.

The supplemental user interface 404 can be used to select and manipulate supplemental content items that may be included in the structured electronic document. One particular embodiment of the supplemental user interface 404 is a task pane of a Smart Documents™ application. In the illustrated embodiment, the supplemental user interface 404 presents controls to the user. The controls enable the user to select and manipulate supplemental content items. In a first step (Step 1) 410, the user typically enters information into the brief 406, such as, for example, party names, dates, case reference number, and/or court identifier, into fields of the caption 408. In a second step (Step 2) 412, the user can add a supplemental content item to the structured electronic document.

To add a supplemental content item, the user selects a content item insertion control, such as an "ADD EVIDENCE TO LIST" button 414. Supplemental content items can be added at any time in the editing process, such as, before, during, or after text is added into the brief 406. After a supplemental content item is added, it is presented to the user in a supplemental content item list 416. In the particular example of FIG. 4, two supplemental content items, named "LETTER" and "PHOTOGRAPH", are in the list of supplemental content items 416. The user can manipulate the supplemental content items in the list 416 in various ways, such as, for example, annotating the items, saving annotated versions as additional supplemental content items, removing the items from the list 416, or creating or removing links between the primary document and supplemental content items.

In this regard, the supplemental user interface includes an annotation control, such as "MARK-UP EVIDENCE" button 418, which enables the user to annotate a select content item in the list 416. A linking control, such as "LINK EVIDENCE" button 420 enables the user to create a link from the primary document 406 to a selected supplemental content item in the list 416. In one embodiment, the user enters a supplemental content item (i.e., target) reference, such as a text reference, into the primary document 406, and simultaneously selects the text reference and the associated content item from the list 416. The user the selects the "LINK EVIDENCE" button 420 to create the link.

An unlinking control, such as "UNLINK EVIDENCE" button 422, enables the user to remove a previously entered link from the primary document 406 to a supplemental content item in the list 416. A content item removal control, such as "REMOVE EVIDENCE FROM LIST" button 424 enables a user to remove supplemental content items from the list 416 of supplemental content items. To remove one of the content items, the user selects the content item to be removed and then selects the "REMOVE EVIDENCE FROM LIST" button 424. Once a content item is removed, it will not be a part of the structured electronic document. A removed supplemental content item is deleted from the file structure storing the supplemental content item.

In various embodiments, the user can have the structured electronic document assembled and stored in a portable storage medium, such as, for example, a compact disc (CD), a remote storage repository, a Flash drive or others. In the particular embodiment shown, the user can cause the structured electronic document to be assembled and stored by selecting a structured document assembly control, such as "BURN CD" button 426. When selected, the "BURN CD" button 426 assembles the various parts of the structured document and stores them on a CD. The user can then deliver the CD to the court, or other interested party. Assembling the structured electronic document typically involves organizing the parts of the structured document into a file structure, adjusting and/or preserving links between the parts of the structured document and creating a self-contained package representing the structured electronic document. The structured electronic document may be stored in a locked manner, such that it cannot be edited further.

Figure 5:
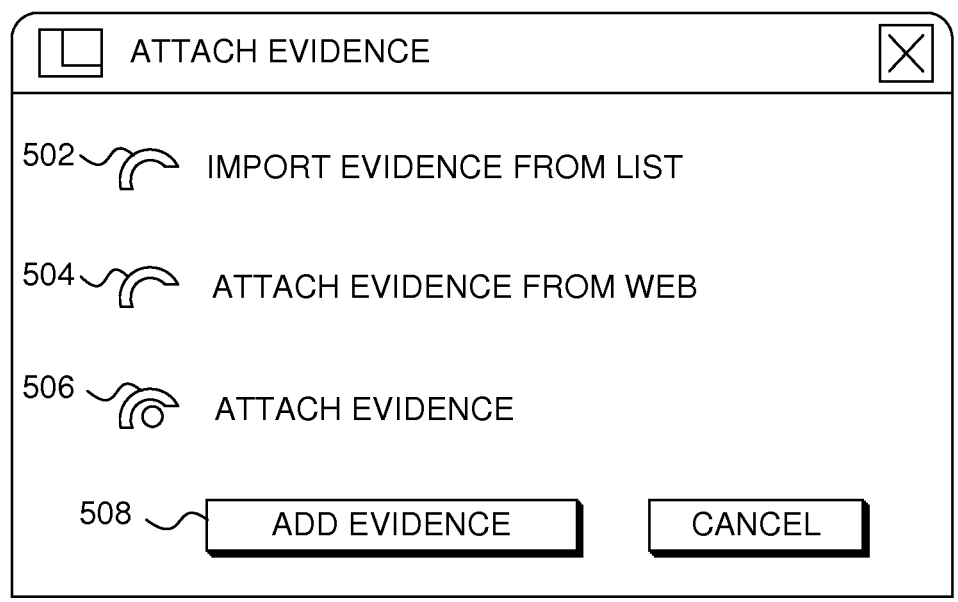

FIG. 5 illustrates an "ATTACH EVIDENCE" GUI 500, which is an example of a supplemental content item insertion GUI. The ATTACH EVIDENCE GUI 500 is presented in response to the user selecting the "ADD EVIDENCE TO LIST" button 414 in one embodiment of the invention. The ATTACH EVIDENCE GUI 500 includes three radio buttons: "IMPORT EVIDENCE FROM LIST" button 502, "ATTACH EVIDENCE FROM WEB" button 504, and "ATTACH EVIDENCE" button 506. In the illustrated example, ATTACH EVIDENCE button 506 has been selected. With radio button 506 selected, when the user selects the "ADD EVIDENCE" button 508, a GUI is presented that enables the user to select a content item for inclusion in the structured electronic document.

Figure 6:
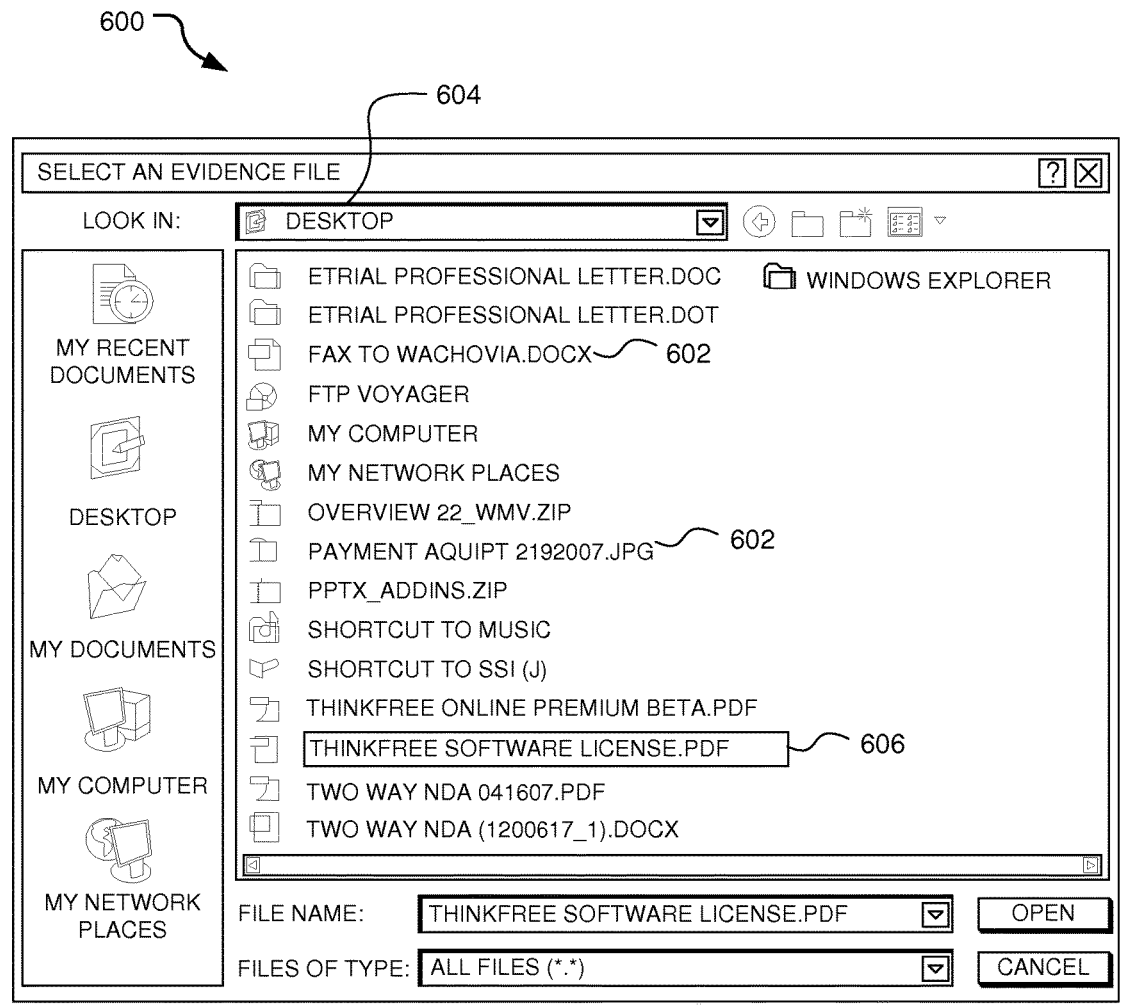
Figure 7:
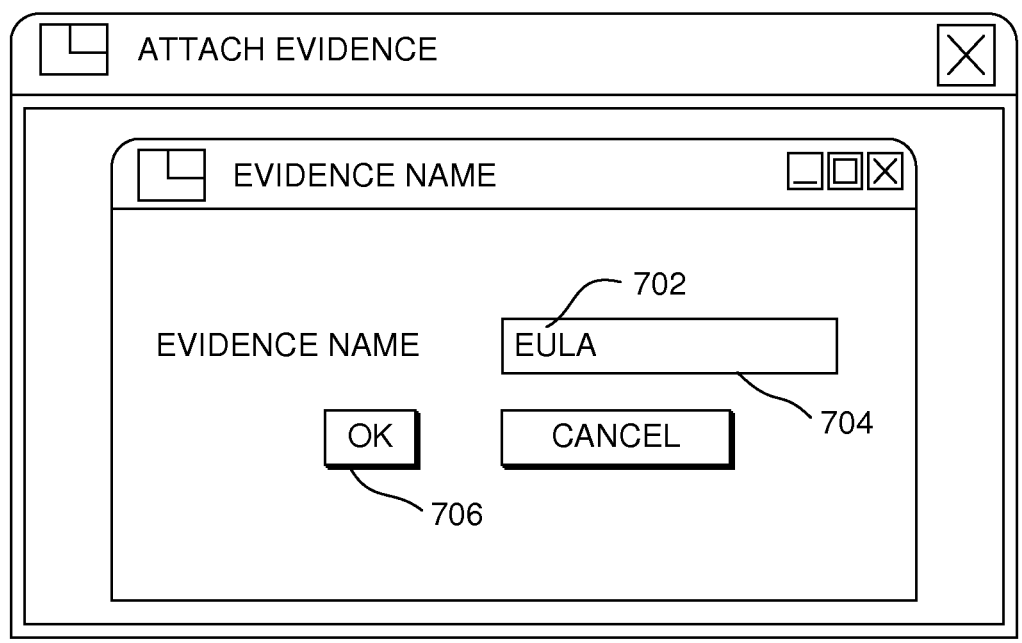

An exemplary supplemental content item selection GUI 600 is shown in FIG. 6. The exemplary content item selection GUI 600 of FIG. 6 presents a number of content items 602 that can be included in the structured document.

In this embodiment, the content items 602 are candidate content items from which the user can choose. The candidate content items 602 are stored at a specified location in memory, such as an original data store. In the exemplary scenario, the user has specified the "DESKTOP", as indicated by the "Desktop" icon 604, in which to search for candidate content items. Of course the user may specify a different data store in which to search for candidate content items. Also in the exemplary scenario, the user has selected a content item named "THINKFREE SOFTWARE LICENSE.PDF" 606. After choosing the content item 606, when the user selects an "OPEN" button 608 of the GUI 600, a filename entry GUI is presented, such as the filename GUI 700 of FIG. 7.

As discussed above, a copy is made of the original content item that the user selects. The copy is stored in another specified location different from that of the original and is used as the supplemental content item for use in the structured electronic document. Through the filename entry GUI 700, the user enters a filename that is applied to the copy of the content item that was selected through the supplemental content item selection GUI 600 (FIG. 6). The user may select the same name as the original content item, or a different name, such as a name that is shorter or more meaningful. The selected name is entered in a filename entry field 704. In the exemplary scenario shown in FIG. 7, the user has selected the filename "EULA" 702 for the supplemental content item in the structured document. After entering the desired filename, the user can select "OK" button 706.

In one embodiment, after the user selects the OK button 706, the user is automatically prompted to annotate the selected supplemental content item. If the user chooses to annotate the supplemental content item at that time, an annotation application is launched that presents an annotation user interface, such as the annotation user interface 900 (FIG. 9), discussed in detail below.

Figure 8:
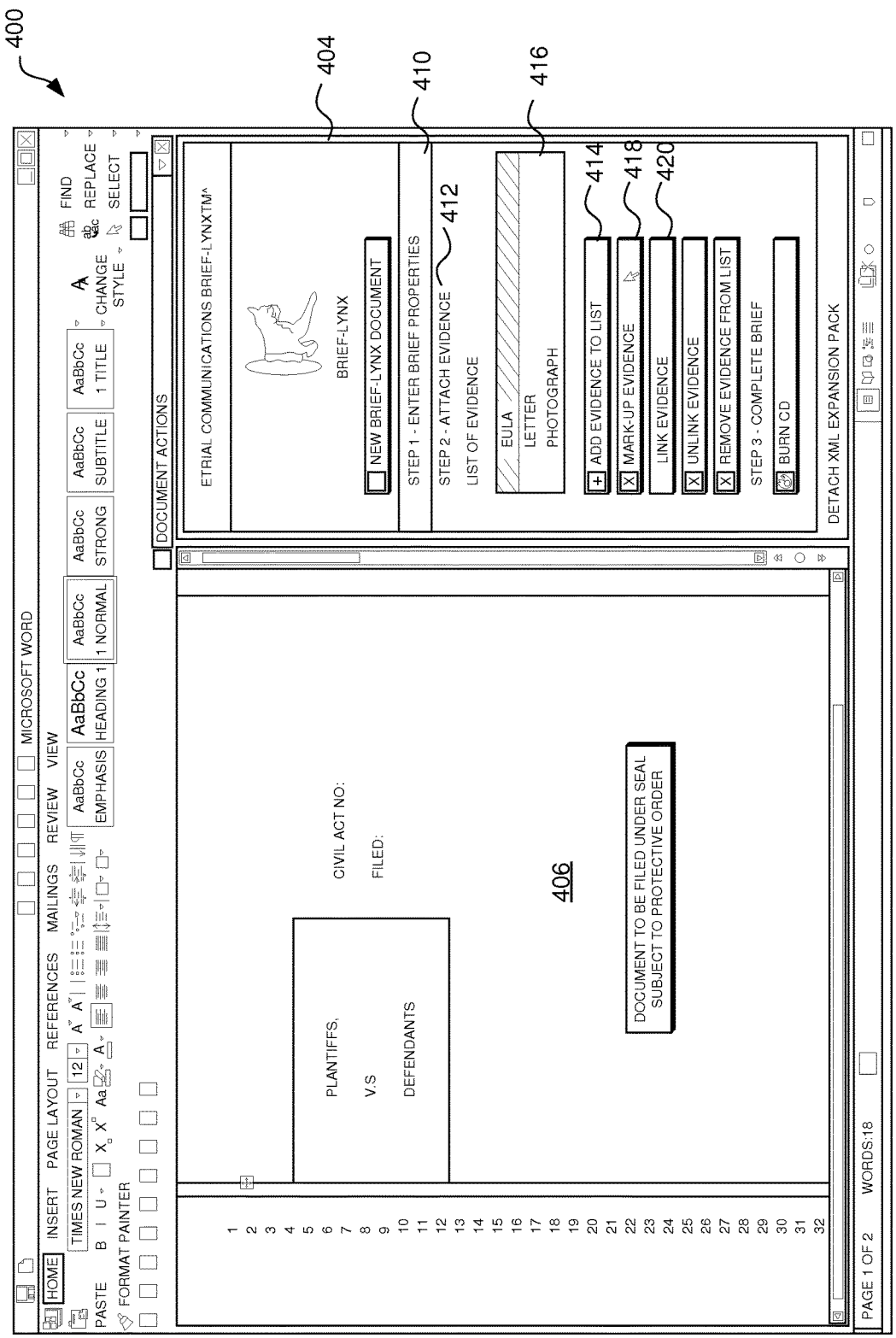
Figure 9:
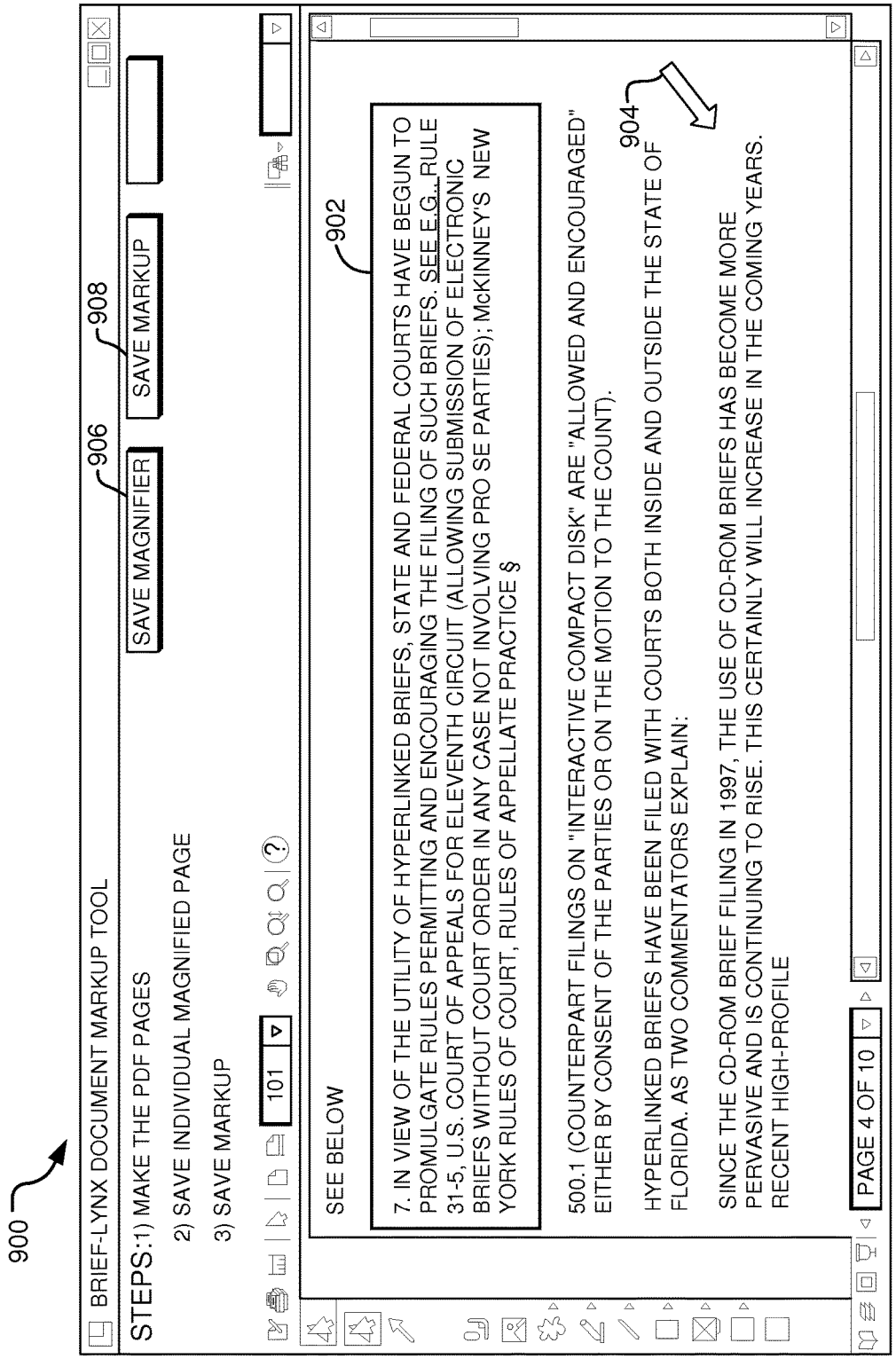
Figure 10:
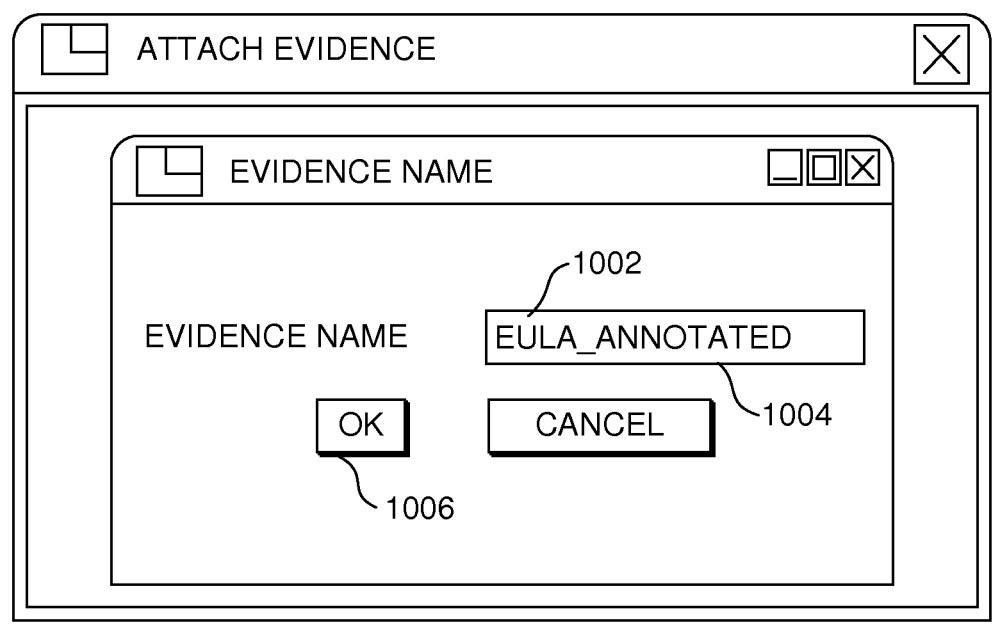

Referring now to FIG. 8 After entering the supplemental content item filename "EULA", the filename is added to the supplemental content item list 416. As discussed above, the user may select any of the supplemental content items identified in the supplemental content item list 416 for annotation. For example, in the scenario illustrated, the user has selected the "EULA" supplemental content item as shown with hash lines. With "EULA" selected, the user can then select the "MARK-UP EVIDENCE" button 418 to annotate the "EULA" supplemental content item.

When the user selects the "MARK-UP EVIDENCE" button 418, an annotation application is launched and an annotation user interface, such as the annotation user interface 900, is presented. Through the annotation user interface 900, the user can insert annotations, such as, for example, boxes, highlighting, arrows, or other markers, or annotate the content item by magnifying or zooming in on the content item. In the illustrative example of FIG. 9, the user has drawn a box 902 around some selected text and the user has positioned an arrow 904 near some other text.

After adding annotations through the annotation interface 900, the user can select a "SAVE MAGNIFIER" button 906 to save a magnified version of the supplemental content item. "SAVE MAGNIFIER" button 906 saves magnification parameters for annotations requiring a zoomed or magnified view of that annotation. The user can also select a "SAVE MARKUP" button 908 to save an annotated supplemental content item that is not magnified. In response to the user selecting the "SAVE MAGNIFIER" button 906 or the "SAVE MARKUP" button 908, another filename entry GUI 1000 is presented. In some embodiments, when the "SAVE MAGNIFIER" button 906 is used with the "SAVE MARKUP" button 908 the "SAVE MARKUP" button 908 alters only the specific page where the magnification was used, and that page is inserted into the annotation where that magnification was saved. Through the filename entry GUI 1000 the user can enter the filename of the annotated supplemental content item. The annotated supplemental content item will be saved in another file having the filename. As discussed above, in various embodiments, the annotated supplemental content item includes one or more annotations that were entered by the user, as well as some other content from the supplemental content item. In the exemplary scenario shown in FIG. 10, the user has entered name "EULA_ANNOTATED" 1002 into the filename entry field 1004. The user may then select an "OK" button 1006 to accept the filename.

Figure 11:
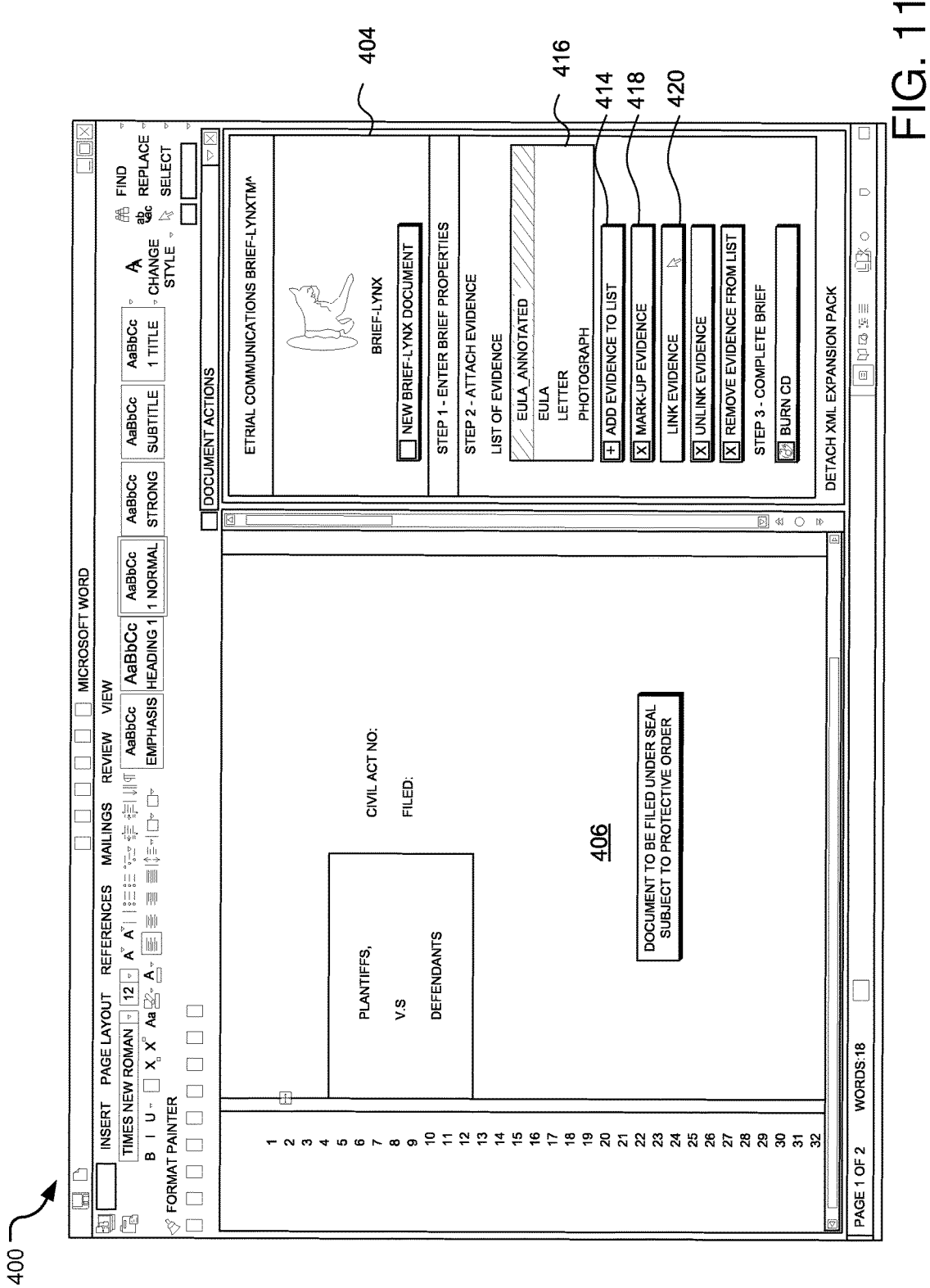

Turning now to FIG. 11, after the user selects the "OK" button 1006, the filename "EULA_ANNOTATED" is added to the list of supplemental content items 416 in the supplemental user interface 404. The user can then select among any of the supplemental content items to link one or more of them to a reference in the primary document 406 using the "LINK EVIDENCE" button 420, remove a link using the "UNLINK EVIDENCE" button 422, and/or remove a supplemental content item from the structured document using the "REMOVE EVIDENCE FROM LIST" button 424.

In the illustration of FIG. 11, the supplemental content item with filename "EULA_ANNOTATED" is selected as shown with hash lines. As such, the user may create a link to the annotated supplemental content item created through the user interface shown in FIG. 9, or otherwise manipulate the annotated supplemental content item named "EULA_ANNOTATED".

In addition, the user may create one or more other annotated supplemental content items from the supplemental content items shown in the list, including other annotated supplemental content items. Whenever the user creates an annotated supplemental content item, for example by selecting the "MARKUP EVIDENCE" button 418, a new annotated supplemental content item is created and given a filename selected by the user. As such, the user can continue to add supplemental content items to the list 416 using items that are already on the list, or the user can add new supplemental content items to the list 416 by selecting another content item from the list of candidate content items.

Example Operations

Figure 12:
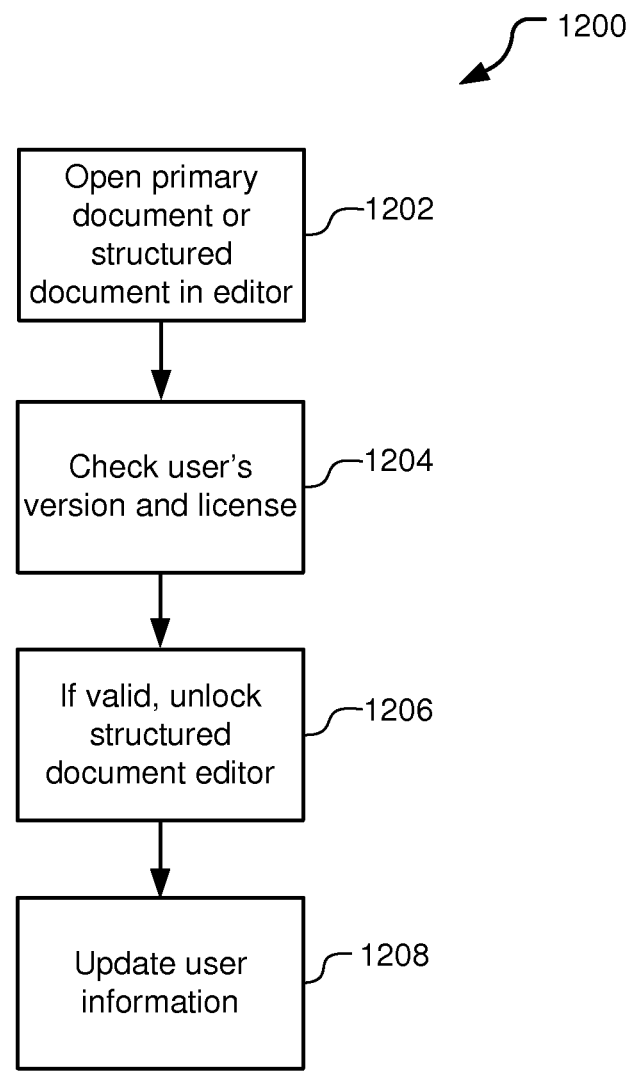
FIGS. 12-14 are flow charts illustrating exemplary algorithms for generating a structured electronic document.
Figure 13:
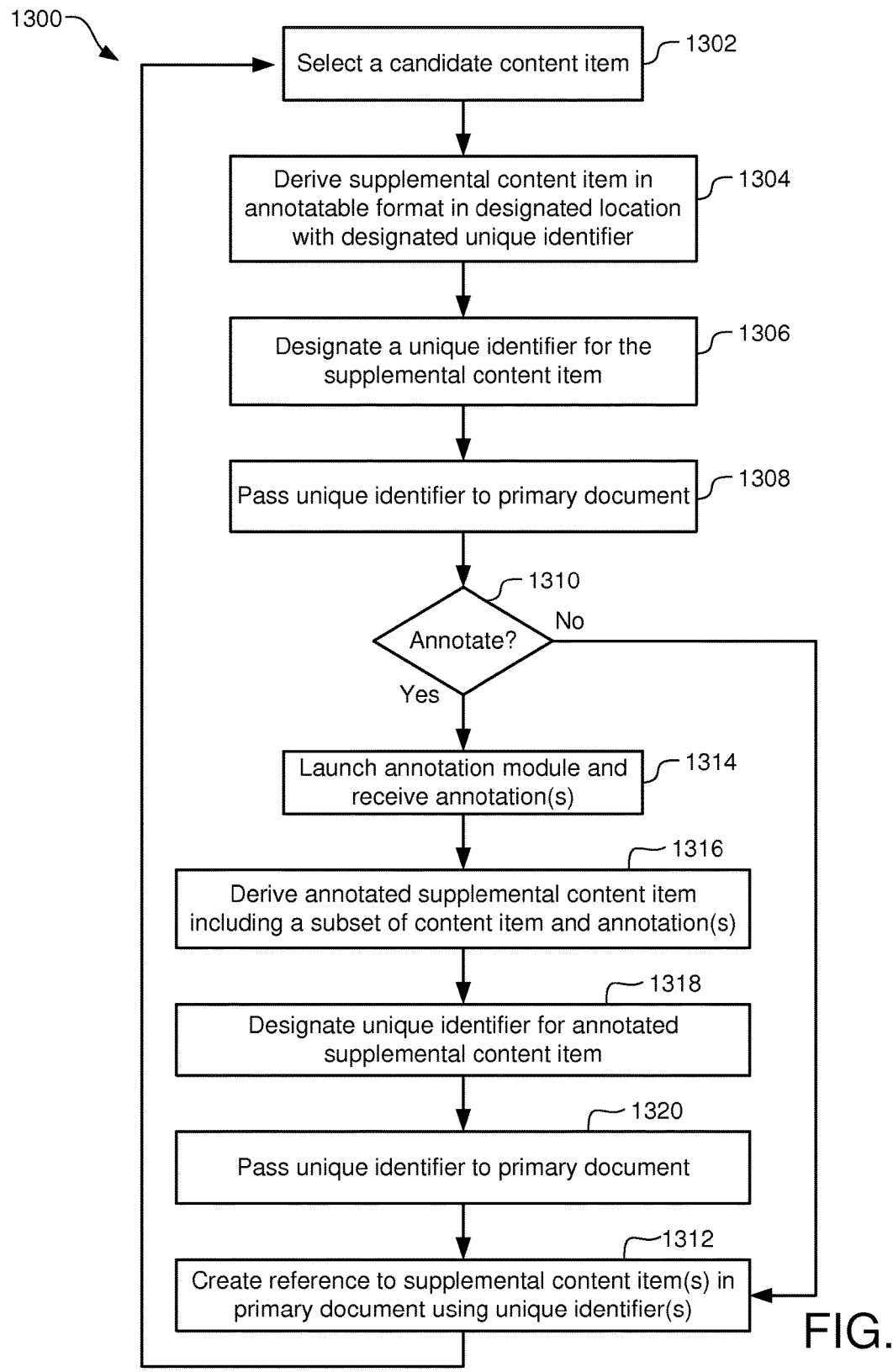
Figure 14:
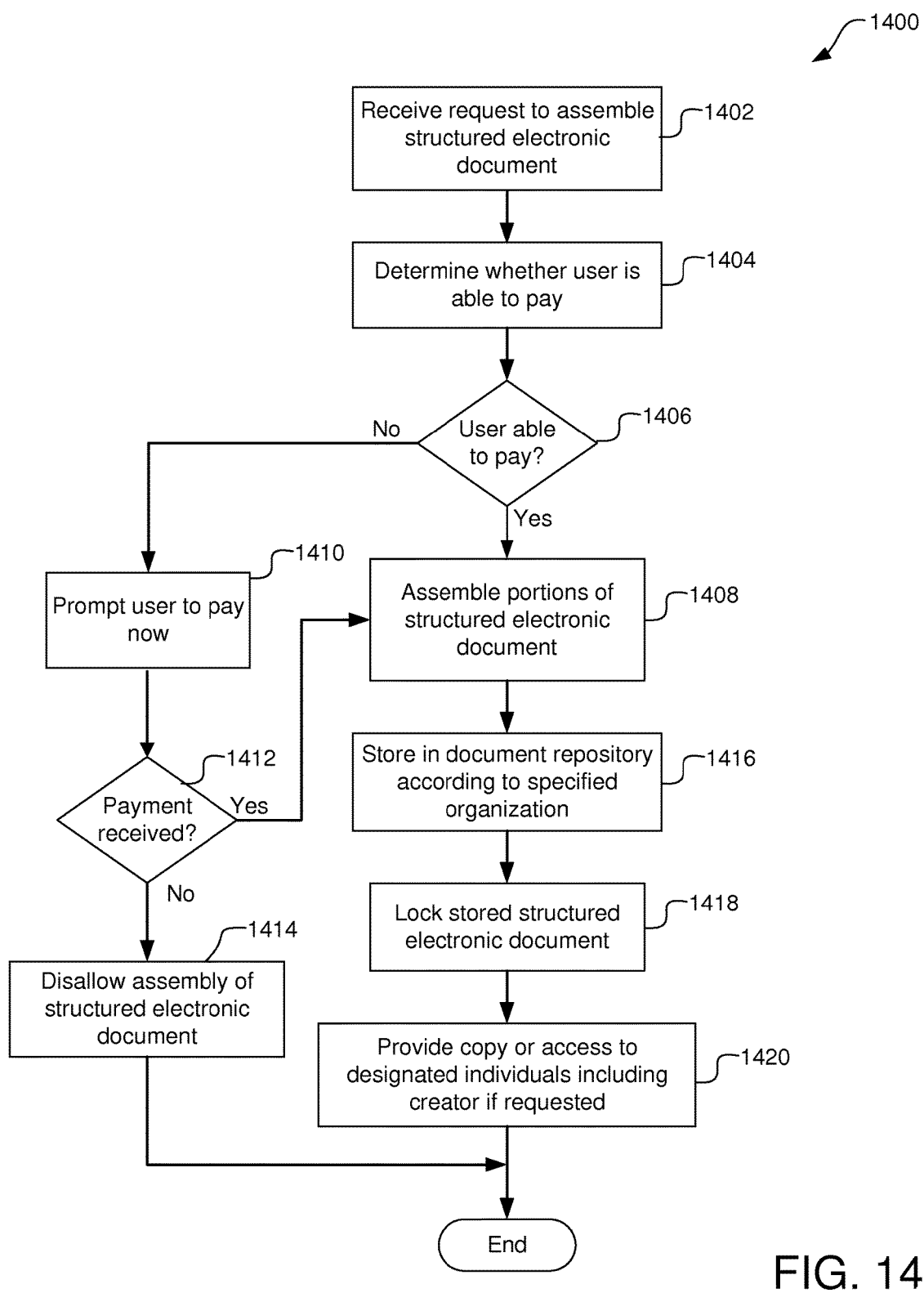

FIGS. 12-14 are flowcharts illustrating exemplary algorithms with operations for generating structured electronic documents. The algorithms may be executed by one or more modules shown in FIG. 1. The algorithms may be encoded on a computer program product, such as a computer-readable medium, in the form of executable computer instructions, whereby a computer can read the instructions and carry out the algorithm.

FIG. 12 illustrates a user authorization algorithm 1200 that determines if a user is authorized to access a structured electronic document. This algorithm may particularly useful when the structured document editor runs on a remote computer, a limited number of licenses are available, or access to the structured document editor is otherwise controlled. For example, an application service provider may control access to the structured electronic document editor or the structured electronic documents. As such, validation information may be sent between the user's computer and a remote computer for authorization. The backend system 124 of FIG. 1 is one example of a remote computer.

In an opening operation 1202, the user attempts to open a primary document or structured document through the structured document editor. The opening operation may be performed by selecting an existing document for opening, opening the document through the editor, or otherwise. In a checking operation 1204, user validation information is checked. In one embodiment, the version and license of the user's structured document editor is checked for validity. For example, it may be determined that the latest version of the editor is being used or whether the license is authentic or paid up. The validation information may be sent to a remote computer for authentication.

In an unlocking operation 1206, the structured document editor is unlocked for use by the user if the user validation information is valid. Once unlocked, the document editor can be used to access, edit, link and assemble a selected structured document. In an updating operation 1208, selected user information is updated in a repository of user identification or license information.

FIG. 13 illustrates an algorithm 1300 for use in generating a structured electronic document that includes a primary document and one or more supplemental content items that may be annotated or unannotated. The generating algorithm 1300 includes operations for use in adding a supplemental content item to a structured electronic document. The algorithm 1300 further includes operations for creating an annotated supplemental content item to be added to the structured document.

Initially, in a selecting operation 1302, a content item is selected. In one embodiment of the selecting operation 1302 a command is received from the user to add a supplemental content item to the structured document. The command to add a supplemental content item may be received through a control presented to the user through a user interface, such as, for example, a user interface described above. In response to receiving a command to insert a supplemental content item, a list of candidate content items may be presented to the user and the user can select one.

A deriving operation 1304 derives a supplemental content item from the selected content item. The deriving operation 1304 may create a copy of the selected content item in a specified location. In one embodiment, if the candidate content item is not in an annotatable format, the deriving operation 1304 converts the format of the supplemental content item to an annotatable format. The filename of the supplemental content item may be different from or the same as the filename of the selected candidate content item. The user may be prompted to enter a filename for the supplemental content data item.

In a designating operation 1306 a unique identifier is designated for the supplemental content item. The unique identifier may be any type of identifier that is at least locally unique and may or may not be globally unique. For example, but without limitation, the unique identifier may be a globally unique identifier (GUID) or a hash of the filename, file folder name, or otherwise. A passing operation 1308 passes the unique identifier to the primary document. In one embodiment of the passing operation 1308, the unique identifier is passed to an API of the document editor.

A query operation 1310 determines whether the user wants to create and annotation from the newly created supplemental content item. In one embodiment, the query operation 1310 automatically prompts the user to annotate. Alternatively, or in addition, the query operation 1310 may detect that the user has selected the supplemental content item and selected a control associated with entering annotations. If the user has not opted to annotate the supplemental content item, the algorithm 1300 branches 'NO' to a creating operation 1312 in which a reference may be created to the supplemental content item in the primary document. The reference includes the unique identifier in order to associate the primary document reference with the supplemental content item. In one embodiment of the creating operation 1312 the user can create a link between the primary document and the supplemental content item.

If in the query operation 1310 the user chooses to create an annotated supplemental content item, the algorithm 1300 branches 'YES' from the query operation 1310 to a launching operation 1314. The launching operation 1314 launches an annotation module. The annotation module accepts user input to create one or more annotations in the supplemental content item.

A deriving operation 1316 derives an annotated supplemental content item based on the user input. In one embodiment the deriving operation 1316 creates a content item that includes the user's annotation(s) and a subset of the supplemental content item. The deriving operation 1318 may save the annotated supplemental content item in the supplemental content item data store with a name that is different from the name of the supplemental content item. As such, another, annotated, supplemental content item is stored in a memory area designated for use in generating the structured electronic document.

A designating operation 1318 designates a unique identifier for the annotated supplemental content item. In one embodiment the unique identifier is at least locally unique and may or may not be globally unique. For example, but without limitation, the unique identifier may be a globally unique identifier (GUID) or a hash of the filename, file folder name, or otherwise. A passing operation 1320 passes the unique identifier to the primary document. In one embodiment of the passing operation 1320, the unique identifier is passed to an API of the document editor.

The creating operation 1312 may then create a link between the primary document and the annotated supplemental content item (and/or the unannotated supplemental content item) using the unique identifier(s). In one embodiment, the creating operation 1312 creates a citation reference in the primary document that includes the unique identifier(s). An example of a citation reference is a hyperlink. After a link is created in the creating operation 1312, the algorithm 1300 may return to selecting operation 1302 or the algorithm 1300 may wait for further user input.

FIG. 14 illustrates an algorithm 1400 for use in assembling a structured electronic document. In the embodiment shown in FIG. 14 it is assumed that the user is required to pay for each assembly. Further, this particular embodiment of the assembling algorithm 1400 conditions assembly on certain criteria, such as, for example, whether the user is able to pay for assembly of the structured electronic document. However, in other embodiments such payment or conditional assembly is not necessary. Typically, the assembling algorithm 1400 occurs after the user has created a structured electronic document by identifying the component parts of the structured electronic document and designating the links between the component parts. One example of an algorithm for creating a structured electronic document is illustrated in FIG. 13 and described above.

In the embodiment of FIG. 14, a receiving operation 1402 receives a request to assemble a structured electronic document. In one embodiment, the request is received through a control of a use interface, such as, for example, the "BURN CD" control 426 shown in user interface 400 (FIG. 4). In other embodiments, the assembly request can be received through a mechanism other than a "BURN CD" control.

A determining operation 1404 determines whether the user requesting assembly is able to pay or has previously paid for the assembly. The determining operation 1404 may access a data store of user license or service subscription information. For example, the determining operation 1404 may determine an account balance of the user. A query operation 1406 compares the user's account balance to a threshold amount. If the account balance is greater than or equal to the threshold amount, the algorithm 1400 branches 'YES' to an assembling operation 1408. If the user's account balance is less than the threshold amount, the algorithm 1400 branches 'NO' to a prompting operation 1410 in which the user is prompted to enter payment.

Another query operation 1412 checks whether payment has been received. If payment has not been received, the algorithm 1400 branches 'NO' to a disallowing operation 1414 in which assembly of the structured electronic document is denied. The algorithm 1400 ends after the disallowing operation.

If, on the other hand, the query operation 1412 determines that payment has been received, the algorithm 1400 branches 'YES' to the assembling operation 1408. The assembling operation 1408 gathers the component parts of the structured electronic document. A storing operation 1416 stores the component parts in a document repository. The document repository may be a portable computer-readable medium (e.g., a compact disc, flash drive, or handheld computer), a remote document repository, or other document repository.

The storing operation 1416 stores the parts of the structured electronic document according to a specified organization. For example, the primary documents may be stored in a first folder, and the supplemental content items may be stored in one or more subfolders of the first folder. Each supplemental content item may be stored in its own subfolder or all the supplemental content items may be stored in one subfolder. The storing operation 1416 preserves any links between the primary document and the supplemental content items. As such, the storing operation 1416 may update links based on the organization of the primary document and the supplemental content items.

A locking operation 1418 locks the stored structured document. In one embodiment, locking operation 1418 makes the document read only, so that the structured electronic document cannot be further edited. The locking operation 1418 may make the structured electronic document password protected. A providing operation 1420 provides access to designated authorized individuals. The authorized individuals may include the creator or individuals designated by the creator or otherwise designated. For example, if the structured electronic document is a brief in a court case, the structured electronic document may be made accessible to a judge or court clerk.

Example Computing Device

Figure 15:
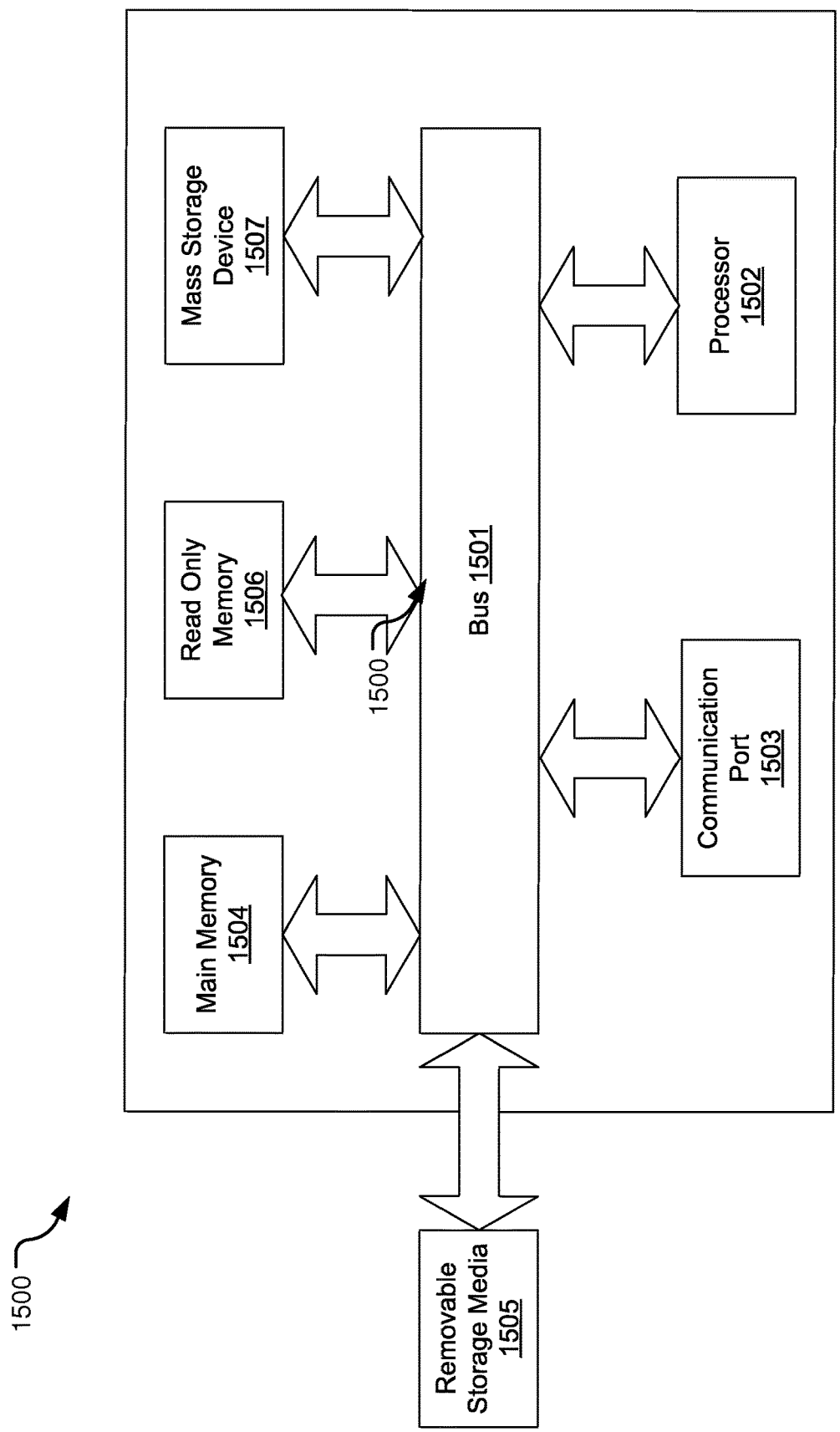
FIG. 15 illustrates a general purpose computing device upon which one or more aspects of embodiments of the present invention may be implemented.

FIG. 15 is a schematic diagram of a computing device 1500 upon which embodiments of the present invention may be implemented and carried out. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 1500 includes a bus 1501, at least one processor 1502, at least one communication port 1503, a main memory 1504, a removable storage media 1505, a read only memory 1506, and a mass storage 1507. Processor(s) 1502 can be any know processor, such as, but not limited to, an Intel® Itanium® or Itanium 2® processor(s), AMD® Opteron® or Athlon MP® processor(s), or Motorola® lines of processors. Communication port(s) 1503 can be any of an RS-232 port for use with a modem based dialup connection, a 10/100 Ethernet port, a Gigabit port using copper or fiber, or a USB port. Communication port(s) 1503 may be chosen depending on a network such a Local Area Network (LAN), Wide Area Network (WAN), or any network to which the computing device 1500 connects. The computing device 1500 may be in communication with peripheral devices (not shown) such as, but not limited to, printers, speakers, cameras, microphones, or scanners.

Main memory 1504 can be Random Access Memory (RAM), or any other dynamic storage device(s) commonly known in the art. Read only memory 1506 can be any static storage device(s) such as Programmable Read Only Memory (PROM) chips for storing static information such as instructions for processor 1502. Mass storage 1507 can be used to store information and instructions. For example, hard disks such as the Adaptec® family of SCSI drives, an optical disc, an array of disks such as RAID, such as the Adaptec family of RAID drives, or any other mass storage devices may be used.

Bus 1501 communicatively couples processor(s) 1502 with the other memory, storage and communication blocks. Bus 1501 can be a PCI/PCI-X, SCSI, or USB based system bus (or other) depending on the storage devices used. Removable storage media 1505 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Visual Linking

Figure 16:
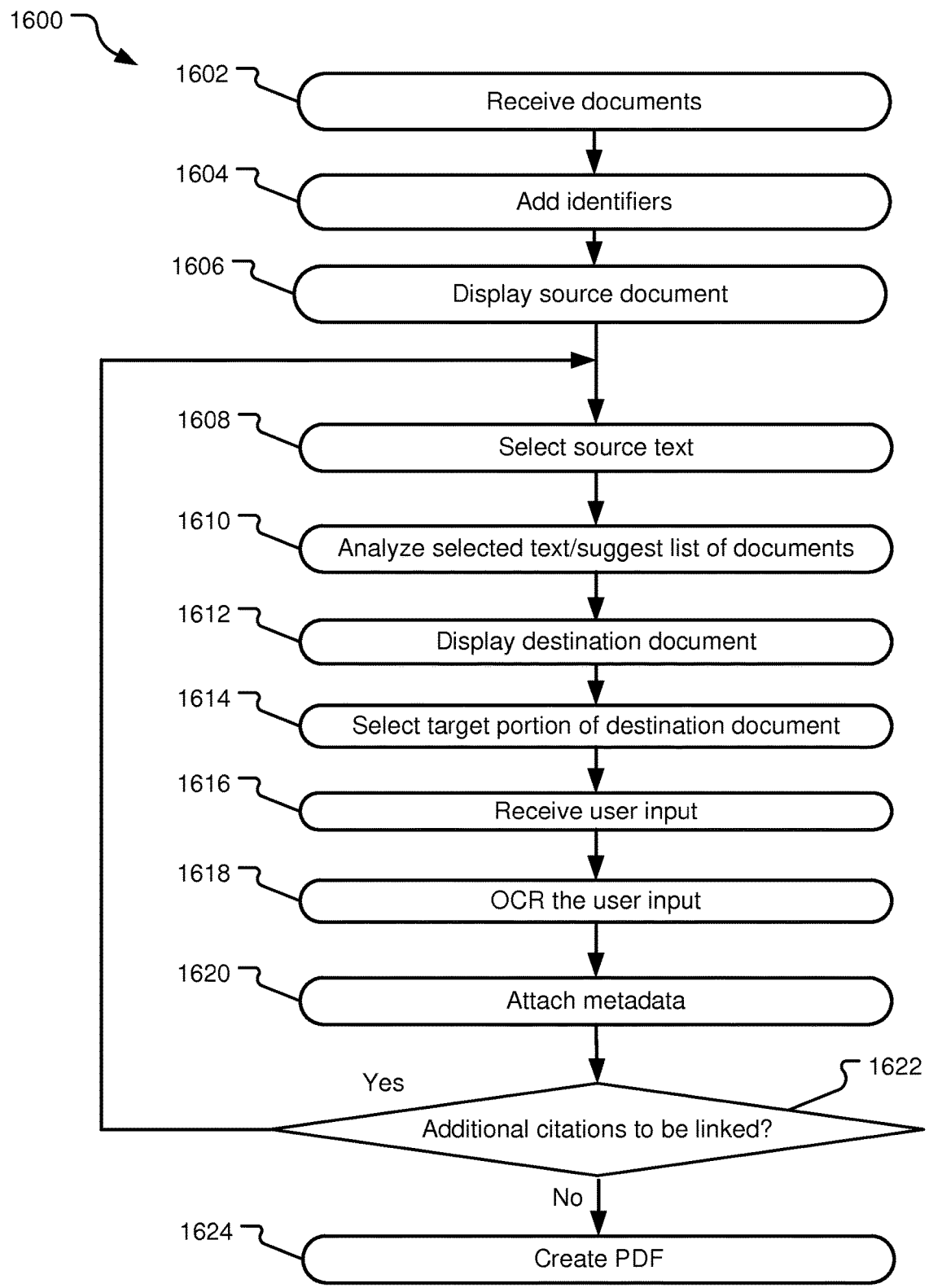
FIG. 16 illustrates an example flowchart with various operations for visual linking of destination documents.

An implementation of the electronic documentation system disclosed herein provides visual linking of electronic documents or portions thereof. Specifically, such visual linking allows at least two documents to be displayed side by side on a user interface and allows linking the two documents. For example, the user interface is divided in two sections with a first section on a left side displaying a source document and a second section on the right side displaying the destination document. Specifically, the destination document is selected from one of a plurality of destination documents based on selection of text or other information from the source document. FIG. 16 discloses an example flowchart 1600 with various operations for such visual linking.

An operation 1602 receives selection of documents and identifies at least one of them as a source document a plurality of other documents as destination documents. For example, for a legal brief that is referring to a large number of cited documents, the legal brief may be designated as the source document and number of other cited documents are designated as the destination documents. In one implementation, each of the received documents are in the form of a PDF document. Such PDF documents may or may not be searchable PDF documents.

An operation 1604 allows a user to add one or more identifiers for each of the documents. Thus, for example, if a destination document is a case related to marijuana dispensary in the city of Boulder, Colo., the user may add identifiers such as "marijuana," "dispensary," "Boulder", etc, for that document. As disclosed further below, such identifiers may be used by the electronic documentation system disclosed herein to suggest one or more particular destination documentation to be linked to a selection of text by a user.

An operation 1606 displays the source document on the left section (referred to as the "source section") of the user interface. Note that alternatively, the right section may also be used as the "source section." The source document may include one or more citations. A user may scroll up and down though the source document using various keyboard and/or mouse options. At an operation 1608, the user may select a portion of text or other component of the source document to be linked to a destination document. For example, if the source document includes a citation to a case, such as "*GreenLeaf Marijuana* v. *City of Boulder*, . . . ," the user may select such citation using mouse, keyboard or other input device.

Furthermore, in an alternative implementation, the operation 1608 also allows a user to select multiple components of a source document to be selected to a destination document or a portion of a destination document. For example, the user may press the shift key and select the text for "*GreenLeaf Marijuana* v. *City of Boulder*, . . . ," subsequent text for "Id.", etc., and then decide to link both of these selections to a same portion of a destination document. Yet alternatively, the user may also select other components of the source document, such as an image, etc. In one implementation, the user may do a global search for a text string and then select all occurrences of the text string to be linked to a destination document. For example, the user may do a global search in the source document for "*GreenLeaf Marijuana* v. *City of Boulder*" link all occurrences of such string to a target portion of a destination document (as further disclosed below).

An operation 1610 analyzes the selected text by the user and analyzes the one or more identifiers to determine likely documents that may be the destination document to be linked to the selected text. Subsequent to the selection of the text the user may, for example, right click or provide other input, in response to which a list of destination documents is displayed on a pop up window. For example, such a pop-up window may be a scrollable window with the listing of the destination documents. In one implementation, the documents identified as the potential destination document based on the analyzing of the selected text and the identifiers may be listed at the top of the listing in the pop-up window.

An operation 1612 receives an input from the user selecting one of the documents from the listing of the documents. For example, after scrolling through the pop-up window, the user may double-click on one of the document to select that as the destination document. Subsequently, the selected destination document is displayed in the right side section (also referred to as the "destination section") of the user interface. Furthermore, the operation 1612 may further display a particular section of the destination document based on the analysis of the selected text of the source document. For example, if the selected text were a citation that cites to a particular page of the destination document, the operation 1612 displays that particular page of the destination document in the destination section. Alternatively, the user may scroll through the destination document, go to a particular page of the destination document, etc.

At an operation 1614, a user selects a target portion of the destination document that is to be linked to the selected text portion (or selected multiple text portions, selected image, etc.) of the source document. For example, the user may select such target portion of the destination document may be selected as a collection of consecutive lines of the destination document, etc. Furthermore, the user may also select various disjointed portions of the destination document and link all of such disjoint portions as target portion to the selected text of the source document. Subsequently upon receiving an input from the user indicating that the user has completed the selection and that the selected target portion is to be attached to the selected text portion of the source document, an operation 1616 generates a record related to the target portion.

An operation 1618 performs optical character recognition (OCR) of the selected target portion and saves the OCR'd information with the record related to the target portion. Furthermore, an operation 1620 attaches various metadata to the record related to the target portion.

An operation 1622 receives an input from the user indicating that the user has completed linking destination documents (or portions thereof) to the source document. Upon receiving such input, an operation 1624 generates a master PDF document that includes the source documents and the selected target portions of one or more destination document. In one implementation, such a master PDF document includes all destination documents in their entirety. In an alternative implementation, only the pages of the destination documents including the target portions are included in the master document. Furthermore, the master document also stores the links from each of the selected text of the source documents to the target portions of the destination document.

The visual linking method disclosed in FIG. 16 allows a user to link various sections of a large number of documents in an efficient manner to a single source document.

Figure 17:
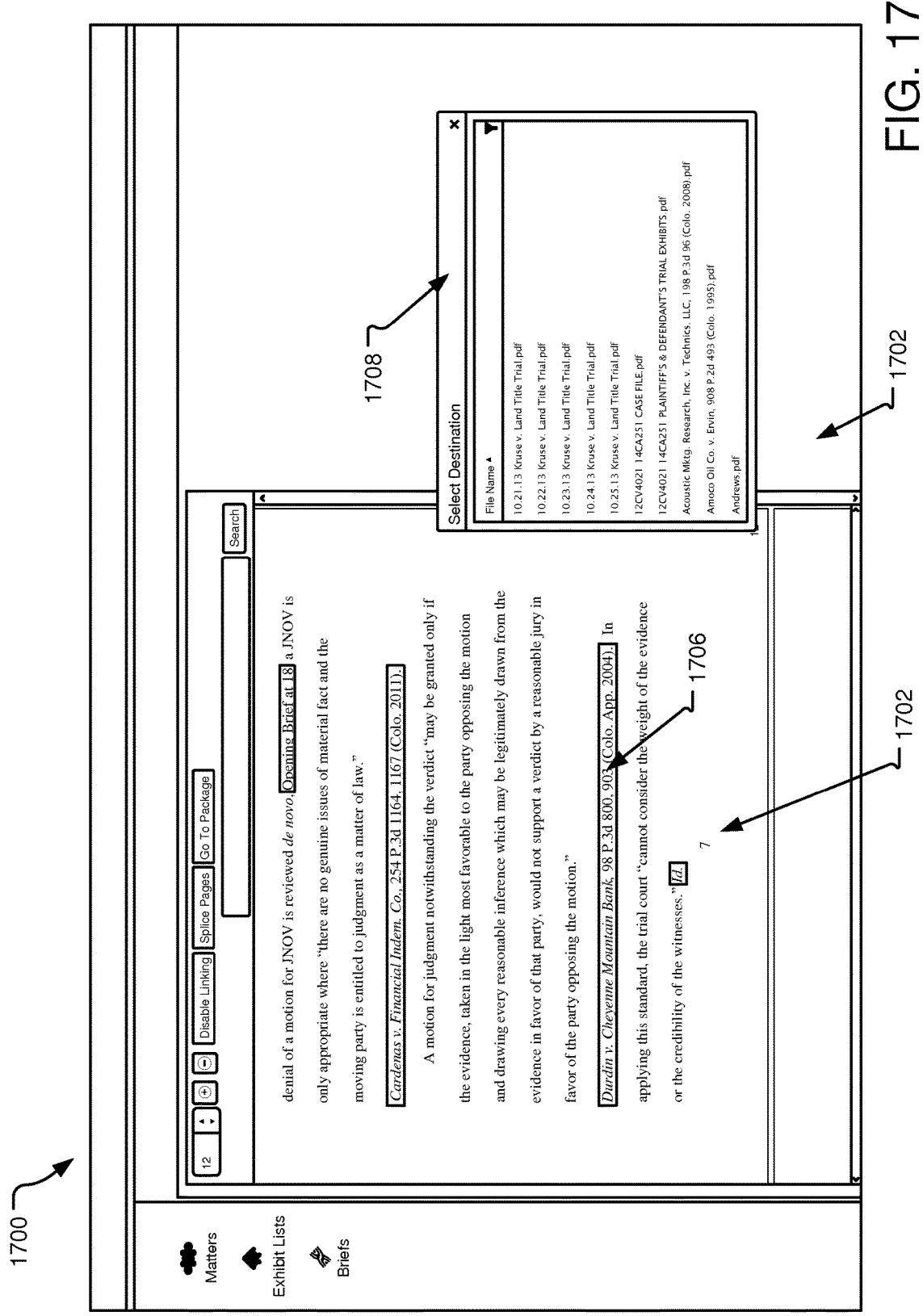
FIG. 17 illustrates an example graphical user interface for visual linking of destination documents.

FIG. 17 illustrates an example graphical user interface 1700 for visual linking Specifically, the GUI 1700 illustrates a source section 1702 and a destination section 1704. A source document such as a brief may be displayed in the source section 1702. The user may select one or more of a citation, such as the citation 1706, in response to which, a window 1708 is presented with a listing of destination documents that may be linked to the citation 1706.

Figure 18:
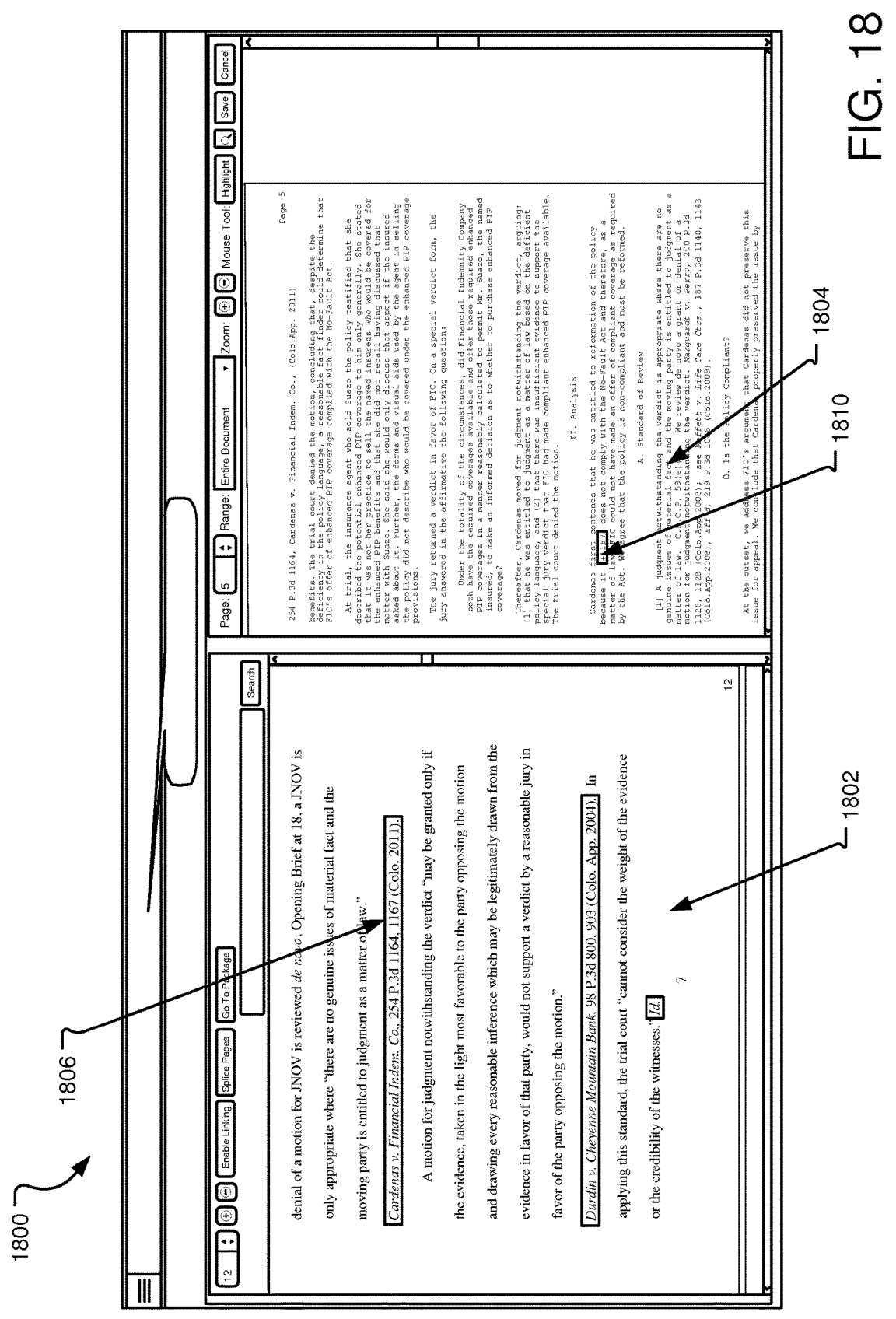

FIG. 18 illustrates an example graphical user interface 1800 for visual linking Specifically, the GUI 1800 illustrates a source section 1802 and a destination section 1804. A source document such as a brief may be displayed in the source section 1802 and a destination document to be linked to a citation 1806 may be displayed in the destination section 1804. A user may select a portion 1810 of the destination document to be linked to the citation 1806.

Figure 19:
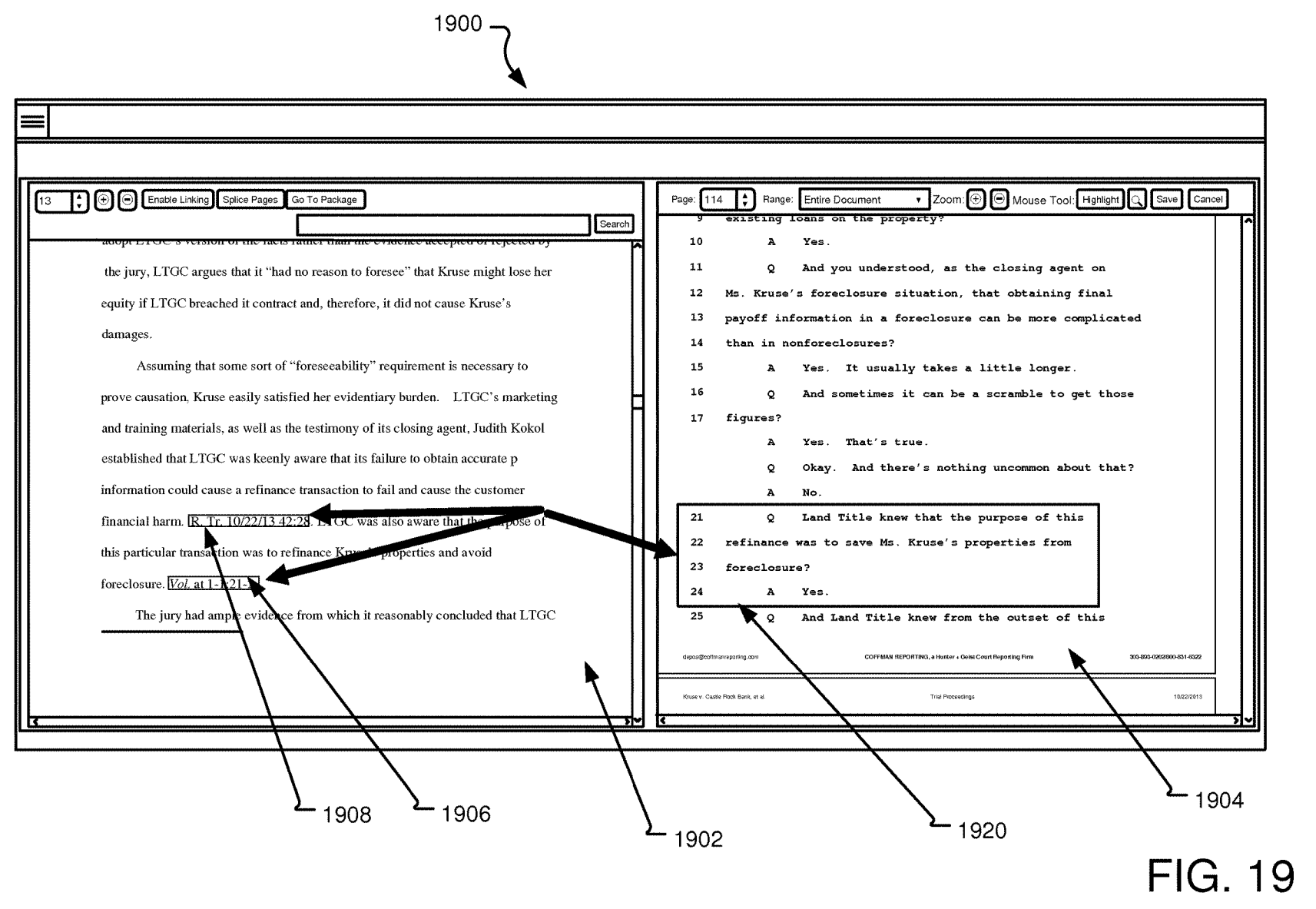

FIG. 19 illustrates an alternative example graphical user interface 1900 for visual linking Specifically, the GUI 1900 illustrates a source section 1902 and a destination section 1904. A source document such as a brief may be displayed in the source section 1902 and a destination document to be linked to a citation 1906 may be displayed in the destination section 1904. A user may select a target portion 1910 of the destination document to be linked to the citation 1806. Furthermore, more than one citation may be linked to the same target portion 1910, thus for example, the citation 1908 is also linked to the target portion 1910. In such a case, the user may first select each of the citations 1906, 1910 and then select the target portion 1910 to generate the link.

Figure 20:
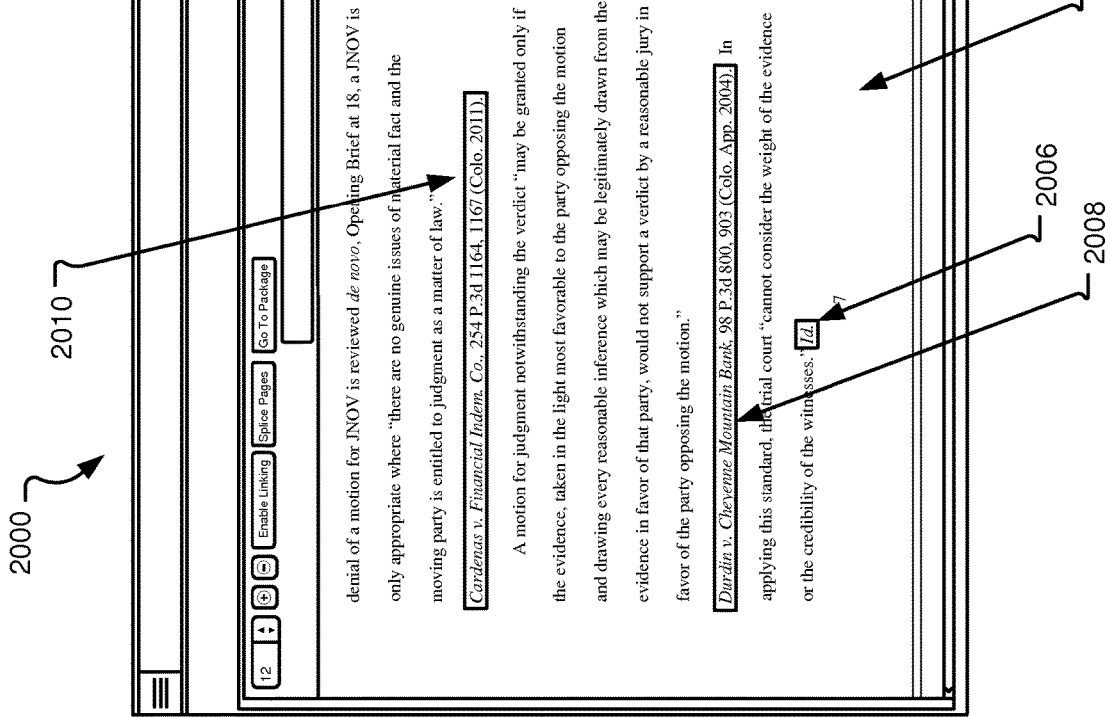
FIG. 20 illustrates yet alternative example graphical user interface for visual linking of destination documents.

FIG. 20 illustrates an alternative example graphical user interface 2000 for visual linking Specifically, the GUI 2000 illustrates a source section 2002 and a destination section 2004. A source document such as a brief may be displayed in the source section 2002 and a destination document to be linked to a citation 2006 may be displayed in the destination section 2004. The user may select each of various citations 2006, 2008, and 2010 and open a new window 2020 to select a new destination document in the destination section 2004 to create links.

Automated Linking

Figure 21:
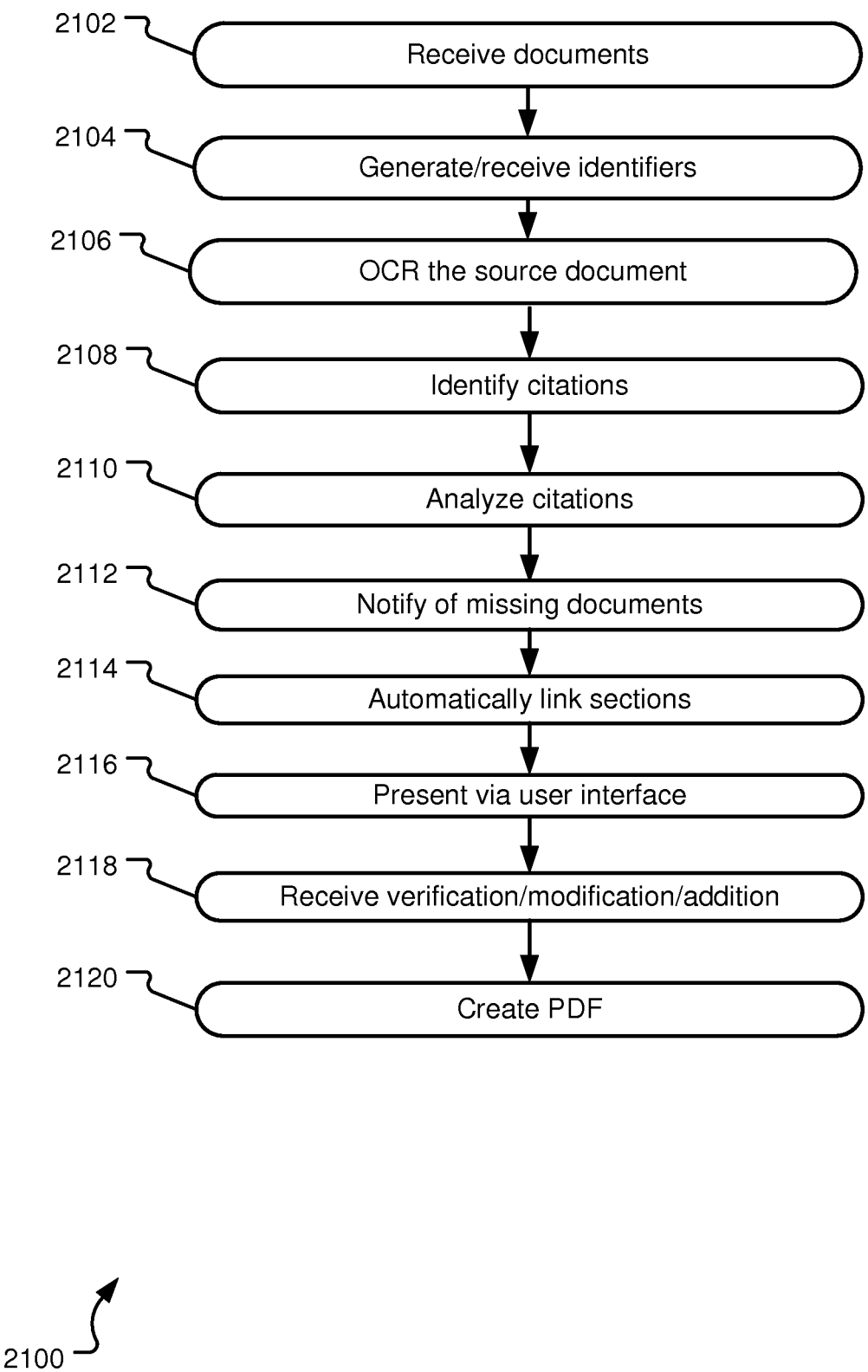
FIG. 21 illustrates example operations for automated linking of documents.

In an alternative implementation of the electronic documentation system disclosed herein provides an automated linking of various documents. Specifically, such automated linking of documents links various destination documents, or sections of destination documents, to a source document. FIG. 21 illustrates various operations 2100 for such an automated linking of documents. Specifically, an operation 2102 receives plurality of documents wherein at least one document is a source document and one or more of the other documents are destination documents. For example, the source document may be a legal brief that has a number of citations that refer to one of the destination documents or portions thereof. In one implementation, each of these documents are PDF documents that may or may not be in a readable PDF format.

An operation 2104 receives identifiers for each of these documents where such identifiers may be text strings that identify or summarize content of the document. As an example, for a document related to a case about inheritance dispute in the state of Alabama, the identifiers may be, "Alabama," "inheritance," etc. A user may manually provide such identifiers using a graphical user interface. Such identifiers may be stored along with the document in a database.

An operation 2106 OCRs the source document and stores the resulting text into a text file for further analysis. An operation 2108 identifies one or more citations from the source document. For example, the operation 2108 may identify a section of text in the source document as a citation if the text is underlines, italicized, etc. Alternatively, the operation 2108 analyze the source document text strings that include language that suggest it to be a citation. For example, occurrence of commonly used citing notation, such as "see," "also see," "Id.", etc., may be taken as suggestions of a possible citation.

An operation 2110 further analyzes the text string and other content of the identified citation to determine potential destination documents. For example, if a text string of an identified citation includes word "Alabama," a destination document with a title including the word "Alabama" or with an identifier "Alabama," may be identified as a potential destination document. Furthermore, the operation 2110 may also analyze text string of the identified citation to see if a particular portion of a destination document is used as the citation. For example, if the text string includes a page number, that page of the destination document may be identified for potential citation. In one implementation, natural language programming or other methodology may be used to analyze the section of text in the source document and to identify the potential destination document.

If there are one or more identified citations are not matched to any destination document, an operation 2112 may notify a user of the missing documents. Alternatively, the operation 2112 may also search the Internet or other source to see if the missing destination document is available through such alternative source. For example, for a citation to a Federal Circuit Court decision, the operation 2112 may access on of the various websites that provides PDF documents for such decisions and download the PDF of the decision and store in the database with other documents provided by the user.

Subsequently, an operation 2114 automatically links the destination document or a portion thereof to the citations in the source document. An operation 2116 presents the source document in a source section of a user interface and allows a user to scroll through the source document and for each citation on the source document, display the destination document or portion thereof in a destination section. At an operation 2118, the user may verify the automated linking of a destination document to a link, modify such linking, or add additional links to the source document. Such verification, modification, and addition of links may be done using the visual linking process further discussed above in FIG. 16.

After receiving an input from a user indicating the user's approval to do so, an operation 2120 may generate a master PDF using the source document, the destination documents or portions thereof.

Figure 22:
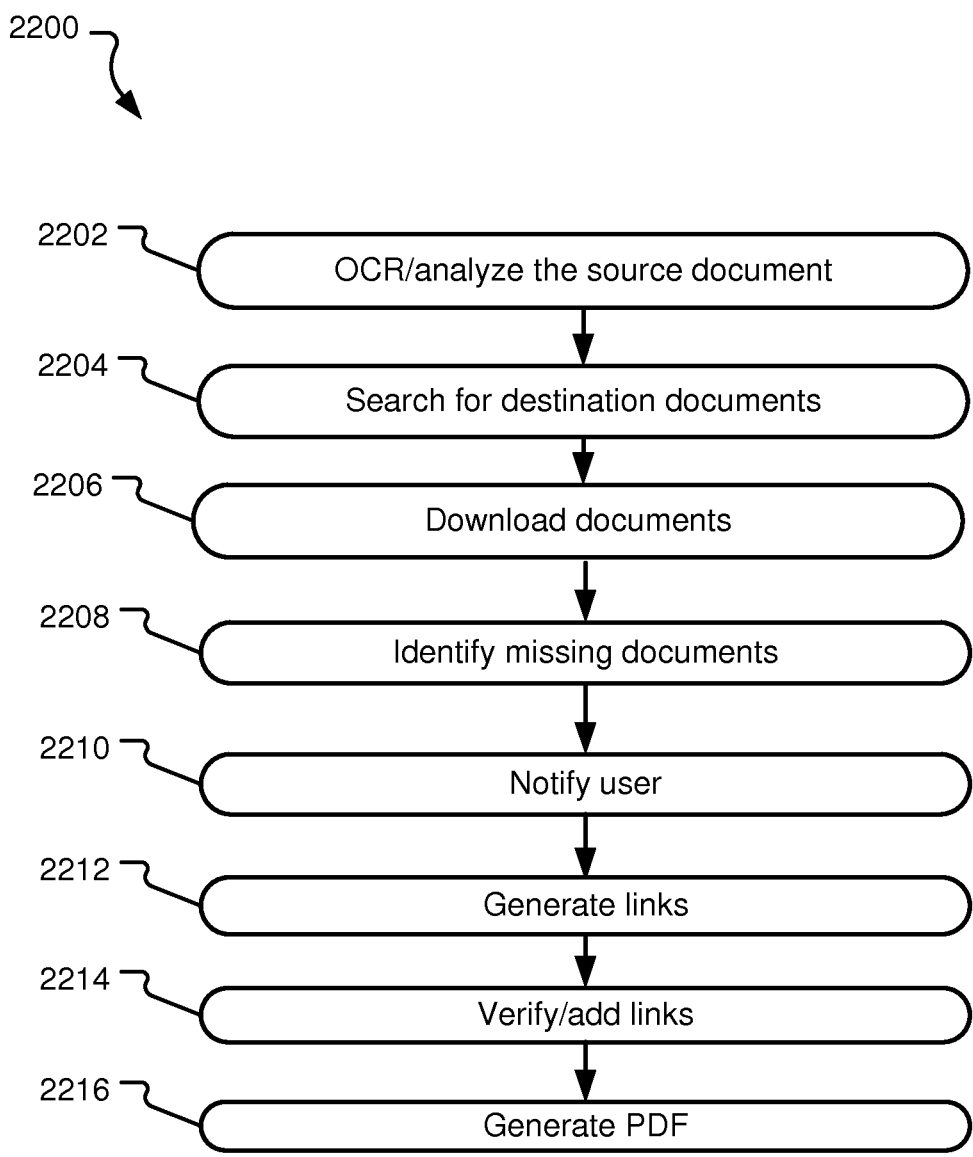
FIG. 22 illustrates alternative example operations for automated linking of documents.

Note that in the flowchart illustrated in FIG. 21, the database of the documents is generated initially based on the documents received from the user and subsequently missing documents are downloaded from alternative sources, such as the Internet, a third party database (such as Lexis, etc.), alternative storage location (Dropbox, Box, etc.). However, in an alternative implementation illustrated in FIG. 22, the electronic documentation system first analyzes (2202) a source document (such as a legal brief) to generate the listing of identified citations and potential destination documents, searches (2204) such alternative sources (the Internet, Lexis, etc.) for the identified source documents, downloads (2206) such identified destination documents, identifies (2208) missing documents, notifies (2210) a user of such missing documents, generates links (2212) to the destination documents or portions thereof from the identified citations, receives verification (2214) and/or additions to such links, and generates (2216) a master PDF using the source document and the destination documents.

Page Splicing

In an alternative implementation of the electronic documentation system disclosed herein allows swapping pages of a source document with alternative pages. This can be used when, for example, a source document includes a typographical error ("typo") in text, especially when such typo is in a text string of a citation. For example, if a citation that should be referring to page 31 of a destination document is by mistake showing page 301 of the destination document. In such as case, the page swapping (also referred to as page splicing) feature of the electronic documents system disclosed herein allows a user to correct the typo for the citation while retaining the link from that citation to the destination document or a portion thereof.

Figure 23:
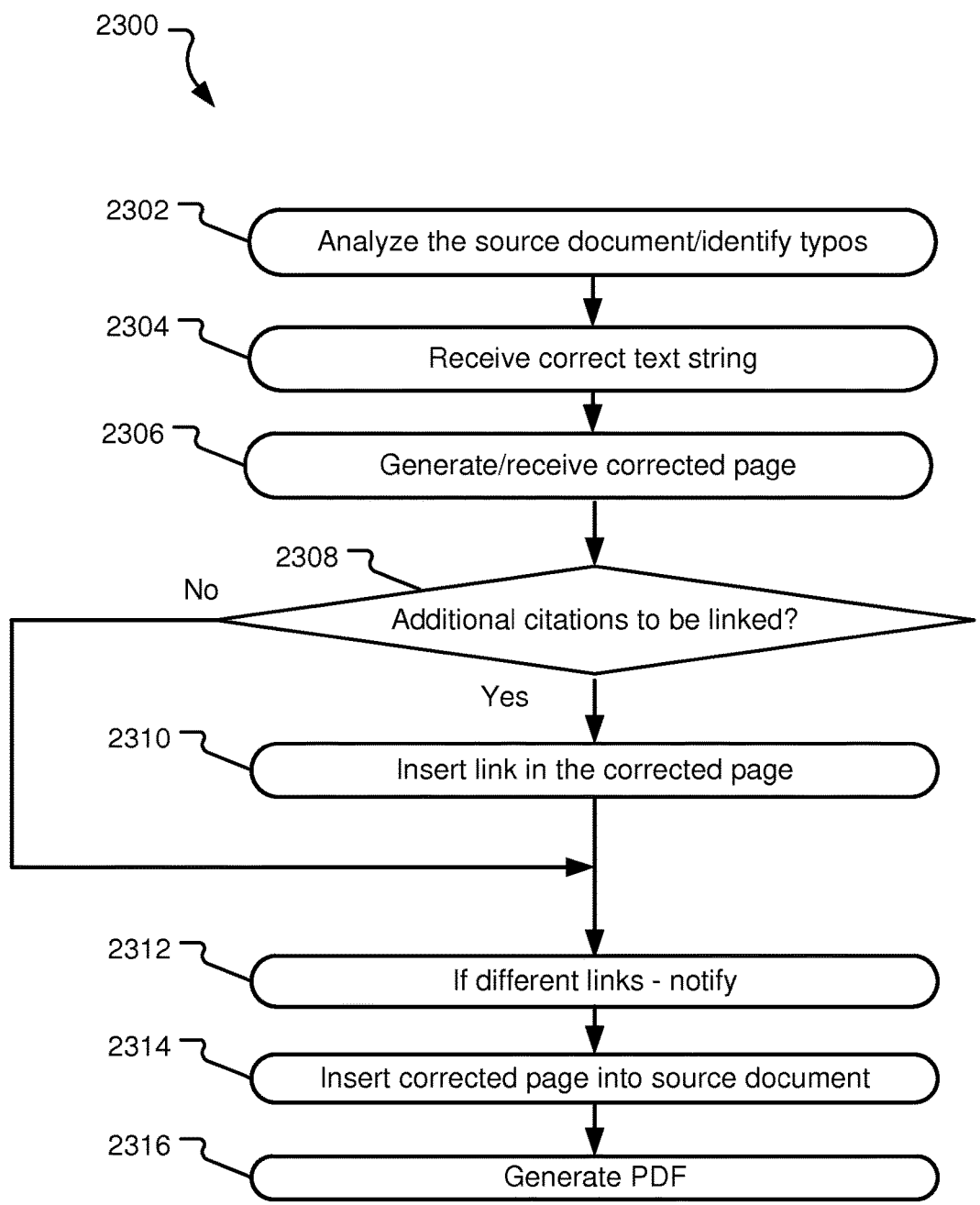
FIG. 23 example operations for page splicing.

FIG. 23 discloses one of more operations 2300 of such page splicing/swapping. An operation 2302 analyzes a source document to identify a typo. Such analysis may be automatic based on for example, missing page on the destination document. In the example illustrated above, if the citation text string points to page 301 while the destination document has only 50 pages, the system may flag this citation as having a typo. Alternatively, a user may identify such typo while reviewing the brief using the visual linking disclosed above or in some other manner.

An operation 2304 allows a user to select the string including a typo and presents an option to correct the typo by providing the correct string in a pop-up window. Subsequently, an operation 2306 generates a corrected PDF page for replacing page that had the typo. Thus, for example, if the typo was found on page 10 of the source document (such as a brief), a new corrected page 10 with correction of the typographical error is generated. In an alternative implementation, the operation 2306 asks the user to provide the new page for with the correction for page 10. In such an implementation, if there are one or more links on page 10 of the source document, all of these links are temporarily stored so that they may be re-inserted into the newly received replacement page from the user.

An operation 2308 determines if the text string including the typo was linked to a destination document or a portion thereof. If such linking exists, an operation 2310 copies the link that was in the original page of the source document and adds this link corrected text string to the corrected page. An operation 2312 evaluates all the links in the corrected page and compares them with the links on the original page with the typo. If it determines that one of such links has changed, it notifies the user of the change for verification or correction.

An operation 2314 inserts the corrected page into the original PDF of the source document. A master PDF is generated at an operation 2316 using the corrected PDF of the source document and the linked destination documents. Note that in an alternative implementation, the operation 2314 may be skipped and the corrected page may be inserted directly into the master PDF.

Figure 24:
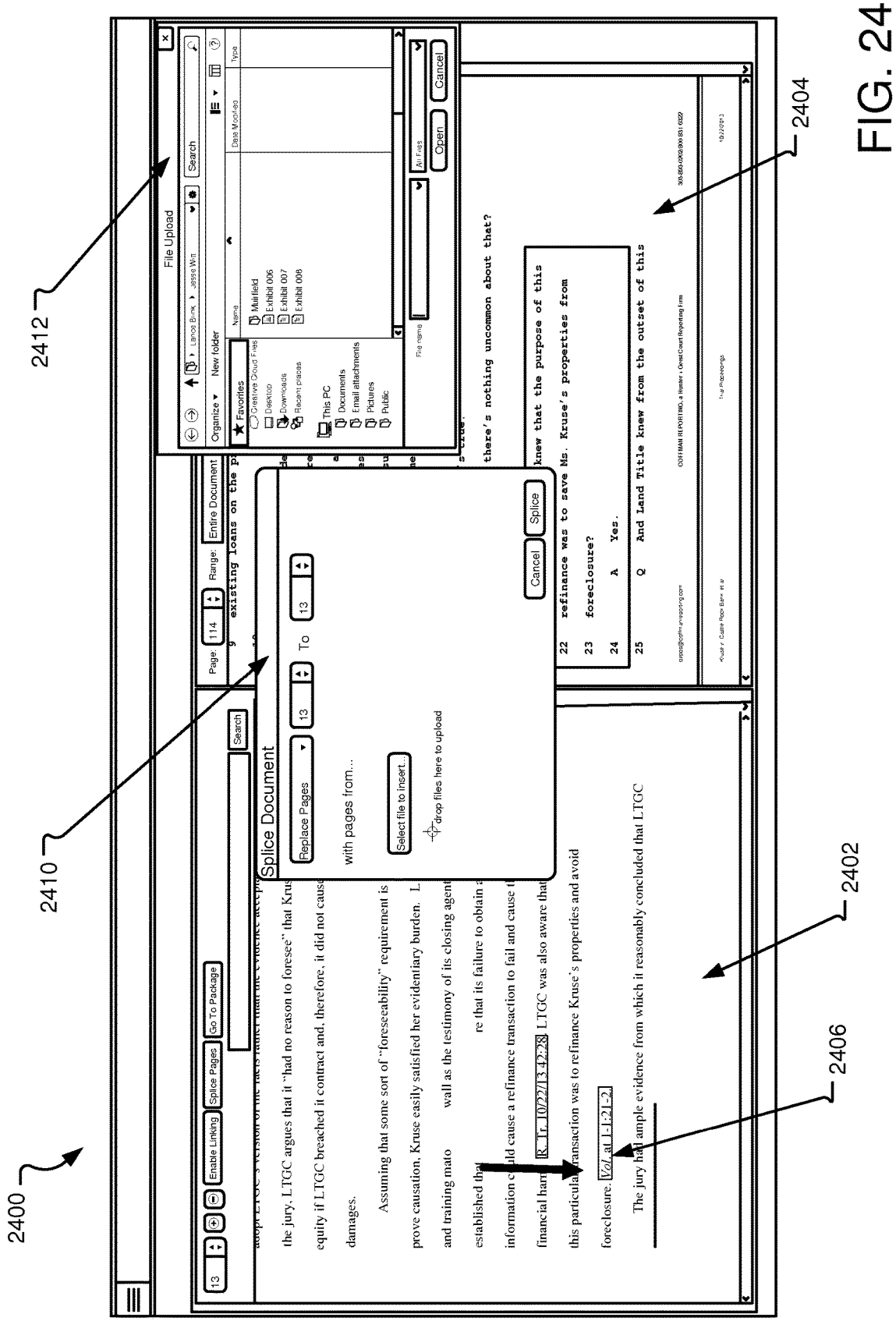
FIG. 24 illustrates an example graphical user interface for page splicing.

FIG. 24 illustrates an example graphical user interface (GUI) 2400 for page splicing. Specifically, the GUI 2400 illustrates a source section 2402 and a destination section 2404. A source document such as a brief may be displayed in the source section 2402. If it is determined that one of the citations, such as the citation 2406 is incorrect, the user may open a window 2410 to splice the source document and request a page with another page. The user may also select the "select file to insert" option to open a window 2412 that allows the user to select the new file from which to select the corrected page. For example, in the illustrated implementation, the user may request replacing page 13 with a new page 13 of the selected document.

Document Packaging

An alternative implementation of the electronic documentation system disclosed herein provides options for different packaging to a user. Specifically, such alternative packaging options allow user to determine how they want to interact with the collection of documents, how the user wants the collection of documents to be delivered to an end user, etc. For example, one implementation generates a single PDF of the documents with the source document at the front end of the documents and each of the destination documents or portions thereof towards the back of the single PDF with links from the source documents to the various destination documents embedded internally in the source document as bookmarks.

An alternative implementation a selected portion of the destination document is extracted from the destination document and it is appended to the source document towards the end. For example, of a citation from a source document linked to a selected portion of the destination document on page 120, the page 120 of the destination document is extracted and appended to the source document. Subsequently an internal link from the source document to the page 100 is provided in the source document. This implementation allows users to substantially reduce the size of the final PDF document. In implementation the user is allowed to specify the number of pages form the destination document that needs to be extracted. For example, even if a citation links to page 120 of the destination document, if it is necessary for pages 115 to be 120 to be included in the final PDF for contextual reasons, the system allows user to specify such range of pages to be extracted and included in the final package of the PDF.

Yet alternative implementation of the electronic documentation system allows an alternative packaging of the documents within a file structure of a computing system. For example, a user can store all the destination documents including exhibits, etc., for a brief into a folder and the links from the source document, such as the brief, links to the destination documents in that folder. This allows the user to use different option for different links to the same document For example, if there are multiple citations from a source document to a single destination document or a portion thereof, each citation can be linked to show the selected portion of the destination document in a different manner. For example, one citation to page 10 first paragraph of a destination document may show that paragraph highlighted where as another citation to page 10 of the same destination document may have two paragraphs highlighted. The user may generate such selective illustration for each citation and linked portion using the visual linking operations disclosed herein.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer implemented method, comprising:
    displaying a source document in a first section of a graphical user interface (GUI) window;
    receiving a selection of source document content from a user;
    in response to the selection of source document content from a user, presenting a listing of potential destination documents;
    receiving a selection of one of the potential destination documents;
    displaying the selected destination document in a second section of the GUI window;
    receiving a selection of destination document content from the user;
    inserting a link from the selected source document content to the selected destination document content in the source document;
    generating a combined document comprising the source document and a portion of the destination document, wherein the portion of the destination document comprising at least the selection of destination document content;
    analyzing the source document to identify a typographical error in an erroneous text string;
    presenting a pop-up window to the user with the erroneous text string;
    receiving replacement text for the erroneous text string;
    analyzing the erroneous text string to determine if it includes a link to a destination document;
    storing the link in response to determining that the erroneous text string includes a link to a destination document.

2. The method of claim 1, further comprising:
    receiving annotation of the selection of destination document content from the user; and
    wherein generating the combined document further comprising generating the combined document comprising the source document and the portion of the destination document comprising at least the annotated selection of destination document content.

3. The method recited in claim 1, further comprising receiving annotation of the destination document content, wherein generating the combined document comprising the source document and the portion of the destination document further comprises generating the combined document comprising the source document and the annotated portion of the destination document.

4. The method recited in claim 1, further comprising analyzing the selected source document content to generate the listing of potential destination documents.

5. The method recited in claim 4, wherein analyzing the selected source document content further comprises analyzing one of more identifiers of each of a plurality of destination documents and generating the listing of potential destination documents based on one of more identifiers of each of a plurality of destination documents.

6. The method recited in claim 1, further comprising receiving a second selection of source document content and inserting a link from the second selection of source document content to the selected destination document content in the source document.

7. The method recited in claim 1, further comprising analyzing the selection of source document content to identify a destination document and a section of the destination document to be linked to the selection of source document content.

8. The method recited in claim 7, further comprising presenting the identified section of the destination document in the second section of the GUI window.

9. The method of claim 1, further comprising:
    generating a partial destination document containing at least the selected destination document content; and
    storing the source document and the partial destination document on a same computing device.

10. The method recited in claim 9, wherein generating the partial destination document further comprises generating the partial destination document including annotation of the selection of destination document content.

11. The method recited in claim 1, further comprising:
    generating a replacement page to replace the source document page including the erroneous text string, the replacement page including the replacement text for the erroneous text string and the link to the destination document at the replacement text; and
    generating a replacement source document including the replacement page in place of the source document page including the erroneous text string.

12. A computer implemented method, comprising:
    displaying a source document in a first section of a graphical user interface (GUI) window;
    receiving a selection of source document content from a user;
    in response to the selection of source document content from a user, presenting a listing of potential destination documents;
    receiving a selection of one of the potential destination documents;
    displaying the selected destination document in a second section of the GUI window;

receiving a selection of destination document content from the user and annotation of the selection of the destination document content;

inserting a link from the selected source document content to the selected destination document content in the source document;

generating a combined document including the source document with the link from the selected source document content to the selected destination document content and at least a portion of the destination document including the annotated selection of the destination document content;

receiving a revised text string for the source document content;

generating a revised source document page with the revised text string replacing the selected source document content;

determining that the selected source document content includes a link to a destination document content; and linking the revised text string of the revised source document page with the destination document content before updating the combined document with the revised source document page replacing the page containing the selected source document contentand.

13. The method recited in claim 12, further comprising: automatically updating the combined document with the revised source document page replacing the page containing the selected source document content.

14. The method recited in claim 12, further comprising: analyzing the selection of the source document content; and generating the listing of potential destination documents based on the analysis of the source document content.

15. The method recited in claim 14, further comprising searching the Internet for at least one of the potential destination documents.

16. The method recited in claim 15, further comprising downloading at least one of the potential destination documents from a third party source on the Internet.

17. A non-transitory computer-readable medium having instructions executable by a computer to cause the computer to carry out a process, the process comprising:

presenting a graphical user interface on an output device of the computer;

displaying a source document in a first section of a graphical user interface (GUI) window;

receiving a selection of source document content from a user;

in response to the selection of source document content from a user, presenting a listing of potential destination documents;

receiving a selection of one of the potential destination documents;

displaying the selected destination document in a second section of the GUI window;

receiving a selection of destination document content from the user;

inserting a link from the selected source document content to the selected destination document content in the source document;

generating a combined document comprising the source document and a portion of the destination document, wherein the portion of the destination document comprising at least the selection of destination document content;

presenting a pop-up window to the user with an erroneous text string;

receiving replacement text for the erroneous text string;

analyzing the erroneous text string to determine if it includes a link to a destination document;

storing the link in response to determining that the erroneous text string includes a link to a destination document.

18. The method recited in claim 17, wherein the portion of the destination document comprising at least the selection of destination document content including an annotated selection of the destination document content.

* * * * *